US012170902B2

(12) United States Patent
Salji

(10) Patent No.: US 12,170,902 B2
(45) Date of Patent: Dec. 17, 2024

(54) USER AGENT INFERENCE AND ACTIVE ENDPOINT FINGERPRINTING FOR ENCRYPTED CONNECTIONS

(71) Applicant: Darktrace Holdings Limited, Cambridge (GB)

(72) Inventor: Carl Joseph Salji, Bedford (GB)

(73) Assignee: Darktrace Holdings Limited, Cambridge (GB)

( * ) Notice: Subject to any disclaimer, the term of this patent is extended or adjusted under 35 U.S.C. 154(b) by 160 days.

(21) Appl. No.: 17/571,153

(22) Filed: Jan. 7, 2022

(65) Prior Publication Data

US 2022/0224716 A1  Jul. 14, 2022

Related U.S. Application Data

(60) Provisional application No. 63/135,394, filed on Jan. 8, 2021.

(51) Int. Cl.
*H04W 12/122* (2021.01)
*H04L 9/40* (2022.01)
(Continued)

(52) U.S. Cl.
CPC .......... *H04W 12/122* (2021.01); *H04L 41/16* (2013.01); *H04L 41/22* (2013.01);
(Continued)

(58) Field of Classification Search
CPC ...... H04W 12/122; H04L 41/16; H04L 41/22; H04L 63/1416; H04L 63/1425; H04L 63/1433; H04L 63/1441; H04L 63/145
See application file for complete search history.

(56) References Cited

U.S. PATENT DOCUMENTS 6,154,844 A  11/2000 Touboul et al.
6,965,968 B1  11/2005 Touboul
(Continued)

FOREIGN PATENT DOCUMENTS

EP  2922268 A1  9/2015
WO  2001031420 A2  5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
(Continued)

*Primary Examiner* — Richard G Keehn
(74) *Attorney, Agent, or Firm* — Rutan and Tucker, LLP

(57) ABSTRACT

A cyber security appliance can inoculate a fleet of network devices by analyzing each endpoint of a secure connection. The appliance can receive a hostname for a malicious web server. The appliance can generate an unencrypted target fingerprint based on sending a series of unencrypted connection protocol requests to the malicious web server and an encrypted target fingerprint based on sending a series of encrypted secure connection protocol requests to the malicious web server. The appliance can build a combined web server fingerprint for the malicious web server based on both the encrypted target fingerprint derived and the unencrypted target fingerprint. The appliance can determine a set of suspicious IP addresses based on the combined web server fingerprint for the malicious web server. The appliance can inoculate a fleet of network devices against a cyberattack using the IP addresses to preemptively alert the fleet of cyber-attack.

20 Claims, 15 Drawing Sheets

(51) Int. Cl.
*H04L 41/16* (2022.01)
*H04L 41/22* (2022.01)

(52) U.S. Cl.
CPC ...... *H04L 63/1416* (2013.01); *H04L 63/1425* (2013.01); *H04L 63/1433* (2013.01); *H04L 63/1441* (2013.01); *H04L 63/145* (2013.01)

(56) References Cited

U.S. PATENT DOCUMENTS

| | | | |
|---|---|---|---|
| 7,307,999 B1 | 12/2007 | Donaghey | |
| 7,418,731 B2 | 8/2008 | Touboul | |
| 7,448,084 B1 | 11/2008 | Apap et al. | |
| 7,843,322 B2 | 11/2010 | Zakrewski et al. | |
| 7,890,869 B1 | 2/2011 | Mayer et al. | |
| 8,312,540 B1 | 11/2012 | Kahn et al. | |
| 8,661,538 B2 | 2/2014 | Cohen-Ganor et al. | |
| 8,819,803 B1 | 8/2014 | Richards et al. | |
| 8,879,803 B2 | 11/2014 | Ukil et al. | |
| 8,966,036 B1 | 2/2015 | Asgekar et al. | |
| 9,043,905 B1 | 5/2015 | Allen et al. | |
| 9,106,687 B1 | 8/2015 | Sawhney et al. | |
| 9,185,095 B1 | 11/2015 | Moritz et al. | |
| 9,213,990 B2 | 12/2015 | Adjaoute | |
| 9,348,742 B1 | 5/2016 | Brezinski | |
| 9,401,925 B1 | 7/2016 | Guo et al. | |
| 9,516,039 B1 | 12/2016 | Yen et al. | |
| 9,516,053 B1 | 12/2016 | Muddu et al. | |
| 9,641,544 B1 | 5/2017 | Treat et al. | |
| 9,705,895 B1* | 7/2017 | Gutzmann | H04L 63/1408 |
| 9,712,548 B2 | 7/2017 | Shmueli et al. | |
| 9,727,723 B1 | 8/2017 | Kondaveeti et al. | |
| 10,237,298 B1 | 3/2019 | Nguyen et al. | |
| 10,268,821 B2 | 4/2019 | Stockdale | |
| 10,419,466 B2 | 9/2019 | Ferguson | |
| 10,516,693 B2 | 12/2019 | Stockdale et al. | |
| 10,701,093 B2 | 6/2020 | Dean | |
| 10,708,281 B1 | 7/2020 | Modalavalasa et al. | |
| 2002/0174217 A1 | 11/2002 | Anderson et al. | |
| 2002/0186698 A1 | 12/2002 | Ceniza | |
| 2003/0070003 A1 | 4/2003 | Chong et al. | |
| 2004/0083129 A1 | 4/2004 | Herz | |
| 2004/0167893 A1 | 8/2004 | Matsunaga et al. | |
| 2005/0065754 A1 | 3/2005 | Schaf et al. | |
| 2007/0118909 A1 | 5/2007 | Hertzog et al. | |
| 2007/0261112 A1* | 11/2007 | Todd | H04L 63/1483 726/2 |
| 2007/0294187 A1 | 12/2007 | Scherrer | |
| 2008/0005137 A1 | 1/2008 | Surendran et al. | |
| 2008/0077358 A1 | 3/2008 | Marvasti | |
| 2008/0109730 A1 | 5/2008 | Coffman et al. | |
| 2008/0133540 A1 | 6/2008 | Hubbard et al. | |
| 2008/0244744 A1 | 10/2008 | Thomas et al. | |
| 2009/0106174 A1 | 4/2009 | Battisha et al. | |
| 2009/0254971 A1 | 10/2009 | Herz et al. | |
| 2009/0271842 A1 | 11/2009 | Baumhof | |
| 2010/0009357 A1 | 1/2010 | Nevins et al. | |
| 2010/0095374 A1 | 4/2010 | Gillum et al. | |
| 2010/0107254 A1 | 4/2010 | Elland et al. | |
| 2010/0125908 A1 | 5/2010 | Kudo | |
| 2010/0235908 A1 | 9/2010 | Eynon et al. | |
| 2010/0299292 A1 | 11/2010 | Collazo | |
| 2011/0093428 A1 | 4/2011 | Wisse | |
| 2011/0213742 A1 | 9/2011 | Lemmond et al. | |
| 2011/0261710 A1 | 10/2011 | Chen et al. | |
| 2012/0096549 A1 | 4/2012 | Amini et al. | |
| 2012/0137367 A1 | 5/2012 | Dupont et al. | |
| 2012/0209575 A1 | 8/2012 | Barbat et al. | |
| 2012/0210388 A1 | 8/2012 | Kolishchak | |
| 2012/0284791 A1 | 11/2012 | Miller et al. | |
| 2012/0304288 A1 | 11/2012 | Wright et al. | |
| 2013/0091539 A1 | 4/2013 | Khurana et al. | |
| 2013/0198119 A1 | 8/2013 | Eberhardt, III et al. | |
| 2013/0198840 A1 | 8/2013 | Drissi et al. | |
| 2013/0254885 A1 | 9/2013 | Devost | |
| 2014/0007237 A1 | 1/2014 | Wright et al. | |
| 2014/0074762 A1 | 3/2014 | Campbell | |
| 2014/0165207 A1 | 6/2014 | Engel et al. | |
| 2014/0207798 A1* | 7/2014 | Salusky | G06F 16/95 707/748 |
| 2014/0215618 A1 | 7/2014 | Amit | |
| 2014/0325643 A1 | 10/2014 | Bart et al. | |
| 2015/0067835 A1 | 3/2015 | Chari et al. | |
| 2015/0081431 A1 | 3/2015 | Akahoshi et al. | |
| 2015/0161394 A1 | 6/2015 | Ferragut et al. | |
| 2015/0163121 A1 | 6/2015 | Mahaffey et al. | |
| 2015/0172300 A1 | 6/2015 | Cochenour | |
| 2015/0180893 A1 | 6/2015 | Im et al. | |
| 2015/0213358 A1 | 7/2015 | Shelton et al. | |
| 2015/0286819 A1 | 10/2015 | Coden et al. | |
| 2015/0310195 A1 | 10/2015 | Bailor et al. | |
| 2015/0319185 A1 | 11/2015 | Kirti et al. | |
| 2015/0341379 A1 | 11/2015 | Lefebvre et al. | |
| 2015/0363699 A1 | 12/2015 | Nikovski | |
| 2015/0379110 A1 | 12/2015 | Marvasti et al. | |
| 2016/0062950 A1 | 3/2016 | Brodersen et al. | |
| 2016/0078365 A1 | 3/2016 | Baumard | |
| 2016/0149941 A1 | 5/2016 | Thakur et al. | |
| 2016/0164902 A1 | 6/2016 | Moore | |
| 2016/0173509 A1 | 6/2016 | Ray et al. | |
| 2016/0241576 A1 | 8/2016 | Rathod et al. | |
| 2016/0352768 A1 | 12/2016 | Lefebvre et al. | |
| 2016/0359695 A1 | 12/2016 | Yadav et al. | |
| 2016/0373476 A1 | 12/2016 | Dell'Anno et al. | |
| 2017/0054745 A1 | 2/2017 | Zhang et al. | |
| 2017/0063907 A1 | 3/2017 | Muddu et al. | |
| 2017/0063910 A1 | 3/2017 | Muddu et al. | |
| 2017/0063911 A1 | 3/2017 | Muddu et al. | |
| 2017/0169360 A1 | 6/2017 | Veeramachaneni et al. | |
| 2017/0270422 A1 | 9/2017 | Sorakado | |
| 2018/0027006 A1 | 1/2018 | Zimmermann et al. | |
| 2018/0054440 A1 | 2/2018 | Bercovich et al. | |
| 2018/0167402 A1 | 6/2018 | Scheidler et al. | |
| 2018/0167412 A1* | 6/2018 | Barrett | H04L 63/1491 |
| 2018/0255075 A1 | 9/2018 | Brugger et al. | |
| 2019/0036948 A1 | 1/2019 | Appel et al. | |
| 2019/0044963 A1 | 2/2019 | Rajasekharan et al. | |
| 2019/0087495 A1* | 3/2019 | Salusky | H04L 63/1416 |
| 2019/0190950 A1 | 6/2019 | Senecal et al. | |
| 2019/0251260 A1 | 8/2019 | Stockdale et al. | |
| 2020/0244673 A1 | 7/2020 | Stockdale | |
| 2020/0280575 A1 | 9/2020 | Dean et al. | |
| 2020/0358792 A1* | 11/2020 | Bazalgette | G06N 20/00 |
| 2021/0273958 A1 | 2/2021 | McLean | |
| 2021/0120027 A1 | 4/2021 | Dean et al. | |
| 2021/0157919 A1 | 5/2021 | Stockdale et al. | |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.
International Search Report and Written Opinion, PCT/US2022/0116667, ISA:US, Apr. 8, 2022, 38 pp.
European Patent Office; Partial Supplementary Search Report; 15 pages; May 14, 2024.

* cited by examiner

User Agent Prediction within TLS connections

Normal HTTP connection (unencrypted)

```
Hypertext Transfer Protocol
  GET / HTTP/1.1\r\n
  Host: localhost:10000\r\n
  User-Agent: curl/7.64.1\r\n
  Accept: */*\r\n
  \r\n
  [Full request URI: http://localhost:10000/]
  [HTTP request 1/1]
  [Response in frame: 9]
```

The system knows what user agent initiated this connection (curl 7.64.1)

HTTPS connection (encrypted)

```
Transport Layer Security
  TLSv1.2 Record Layer: Handshake Protocol: Client Hello
    Content Type: Handshake (22)
    Version: TLS 1.0 (0x0301)
    Length: 223
    Handshake Protocol: Client Hello
      Handshake Type: Client Hello (1)
      Length: 219
      Version: TLS 1.2 (0x0303)
      Random: b6afeaf2e93b00e1c36307...
      Session ID Length: 0
      Cipher Suites Length: 92
      Cipher Suites (46 suites)
      Compression Methods Length: 1
      Compression Methods (1 method)
      Extensions Length: 86
      Extension: server_name (len=14)
      Extension: ec_point_formats (len=2)
      Extension: supported_groups (len=8)
      Extension: signature_algorithms (len=28)
      Extension: application_layer_protocol_negotiation (len=14)
      [JA3 Fullstring: 771,49200-49196-49192-...]
      [JA3: aa4ad0f090c4af1c3168caa3f9455]
```

Hides what user agent initiated this connection — could be malware, could be a browser.

HOWEVER, some characteristics the system has access to:
- Source hash such as a Client JA3 hash
- Host name
- Target hash such as a Server JA3 hash

Figure 15 ated an unencrypted target fingerprint based on intransient characteristics of the malicious web server gleaned from the series of unencrypted connection protocol requests and subsequent responses. The system can send a series of encrypted secure connection protocol requests to the malicious web server. The system can generate an encrypted target fingerprint for the malicious web server based on the series of encrypted secure connection protocol requests. The system can build a more specific fingerprint of the malicious web server from the encrypted target fingerprint and the unencrypted target fingerprint combined. The system can take autonomous actions to inoculate a fleet of network devices against a cyberattack using the combined web server fingerprint to alert the fleet to future sources of danger.

These and other features of the design provided herein can be better understood with reference to the drawings, description, and claims, all of which form the disclosure of this patent application.

USER AGENT INFERENCE AND ACTIVE ENDPOINT FINGERPRINTING FOR ENCRYPTED CONNECTIONS

RELATED APPLICATION

This application claims priority to and the benefit of under 35 USC 119 of U.S. provisional patent application titled "A CYBER SECURITY SYSTEM," filed Jan. 8, 2021, Ser. No. 63/135,394, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system. In an embodiment, Artificial Intelligence (AI) is applied to analyzing cyber security threats, where the AI does both the analysis and data gathering to assess cyber threats to the system.

BACKGROUND

Day zero attacks have traditionally been a problem for cyber protection systems to deal with. Existing methods of cyber protection generally rely on a cyber threat attacking some system and then a human or some other mechanism identifying the cyber threat for the benefit of subsequent protection appliances rather than actually actively hunting and detecting for cyber threats that have yet to be identified and mitigating before they can complete the cyber attack.

In addition, some of these cyber threats that have yet to be identified can use an IP address of a proxy service and/or IP addresses of some other endpoint for a generally benign web server, such as Dropbox, to reduce the suspicion with communications between a malicious user agent/process on a client device with this endpoint IP address. The malicious actor behind the cyber threat merely needs to create an account on one of these benign web servers. The cyber threats that have yet to be identified can use IP addresses for the proxy service and/or IP addresses for their account on these benign web servers to facilitate their cyber attack.

SUMMARY

In an embodiment, an AI based cyber security appliance protects a system, including but not limited to a network, from cyber threats. A cyber security appliance can analyze each endpoint in a secure connection. The cyber security appliance with an AI trained classifier can predict a user-agent string that initiated a connection based on a source hash derived from the encrypted connection characteristics of a client application, an endpoint name, and a server hash derived from the encrypted response characteristics of the endpoint. The system can receive the hostname or internet protocol (IP) address for a malicious web server. The system can send a series of unencrypted connection protocol requests to the malicious web server. The system can gen-

DRAWINGS

The drawings refer to some embodiments of the design provided herein in which:

FIG. 15 illustrates a block diagram of an embodiment of a hash sub-module configured to generate the series of unencrypted connection protocol requests to glean the intransient characteristics of the malicious web server as well as to generate encrypted connection protocol requests to glean the characteristics of the secure communications with the malicious web server.

Figure 1:
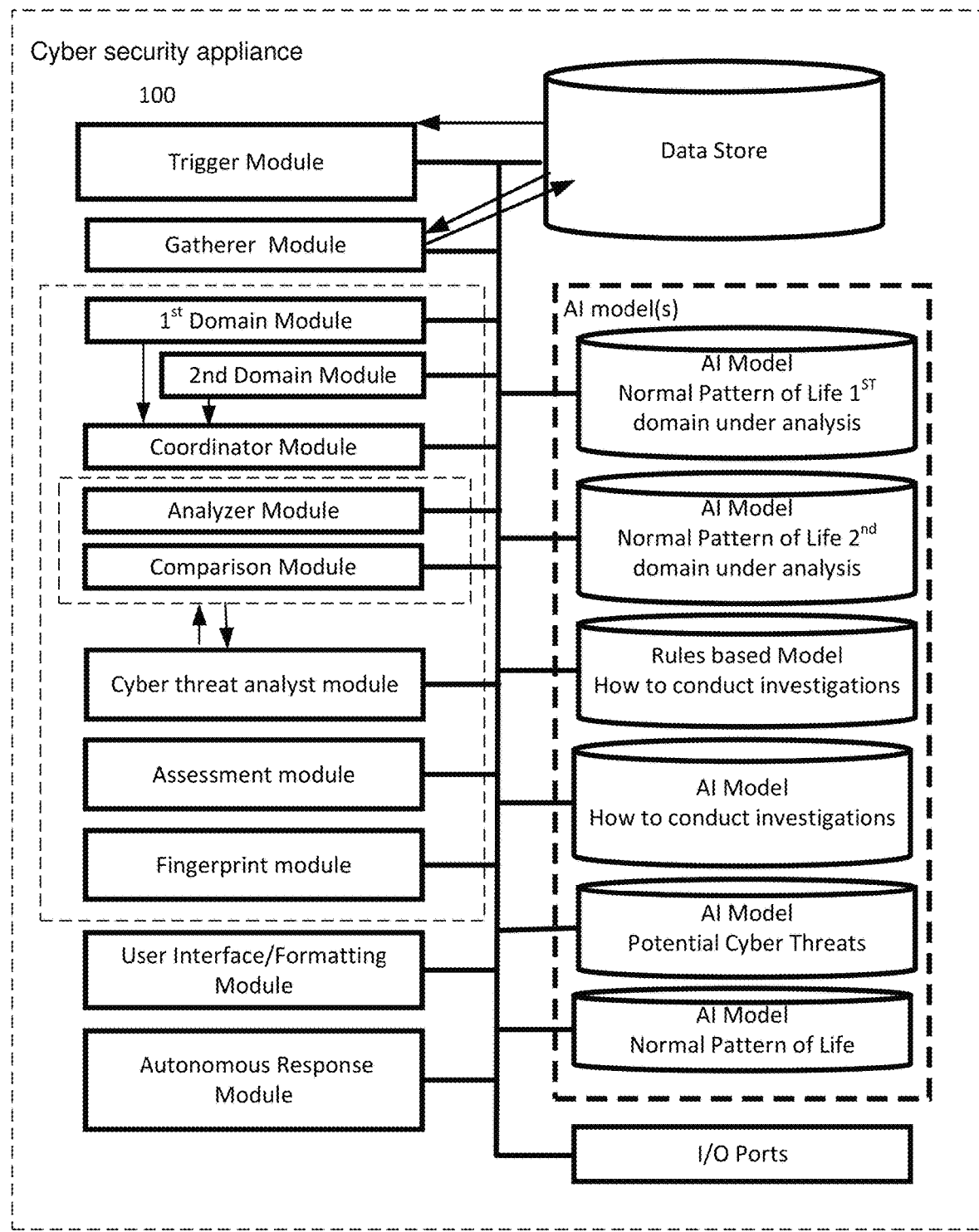
FIG. 1 illustrates a block diagram of an embodiment of a cyber security appliance with a fingerprint module and an AI classifier trained to predict user agents in order to identify cyber threats.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., to provide a thorough understanding of the present design. It will be apparent, however, to one of ordinary skill in the art that the present design can be practiced without these specific details. In other instances, well known components or methods have not been described in detail but rather in a block diagram to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

A cyber security appliance can fingerprint user agents, processes and endpoints (including web servers) utilizing a wide fleet of cybersecurity appliances and identifying potential candidates through an anomaly detection engine that uses both passive and active measures. These identifiers can identify benign expected user agents, anomalous user agents, and previously unknown anomalous IP addresses associated with endpoints which are very likely associated with a known malicious process and/or web server.

FIG. 1 illustrates a block diagram of an embodiment of a cyber security appliance with a fingerprint module and an AI classifier trained to predict user agents in order to identify cyber threats.

The cyber security appliance 100 can include various internal components as well as incorporate data from across multiple platforms used by the client devices in the network to identify a cyber threat.

A domain module can collect, from one or more probes/sensors deployed to i) one or more network devices, ii) network taps, iii) traffic mirroring components, iv) etc. information including connection protocol requests. Information from the connection protocol requests can be transformed into, for example, 1) a source hash, 2) a hostname, and 3) an endpoint hash, such as a server hash. The source hash, such as a client JA3 hash, can be derived from the encrypted connection characteristics of the client application connecting to an endpoint outside the network, such as a proxy service and/or a web server, being protected by the cyber security appliance 100. The hostname, such as a server name, can be associated with the endpoint outside the network (e.g. www.dropbox.com). The server hash, such as a server JA3 hash, can be derived from the encrypted connection characteristics of the endpoint response from outside the network being protected by the cyber security appliance 100. Note, an endpoint can be a remote computing device that communicates back and forth with a device and/or application within a network to which it establishes a protocol connection with.

Figure 6:
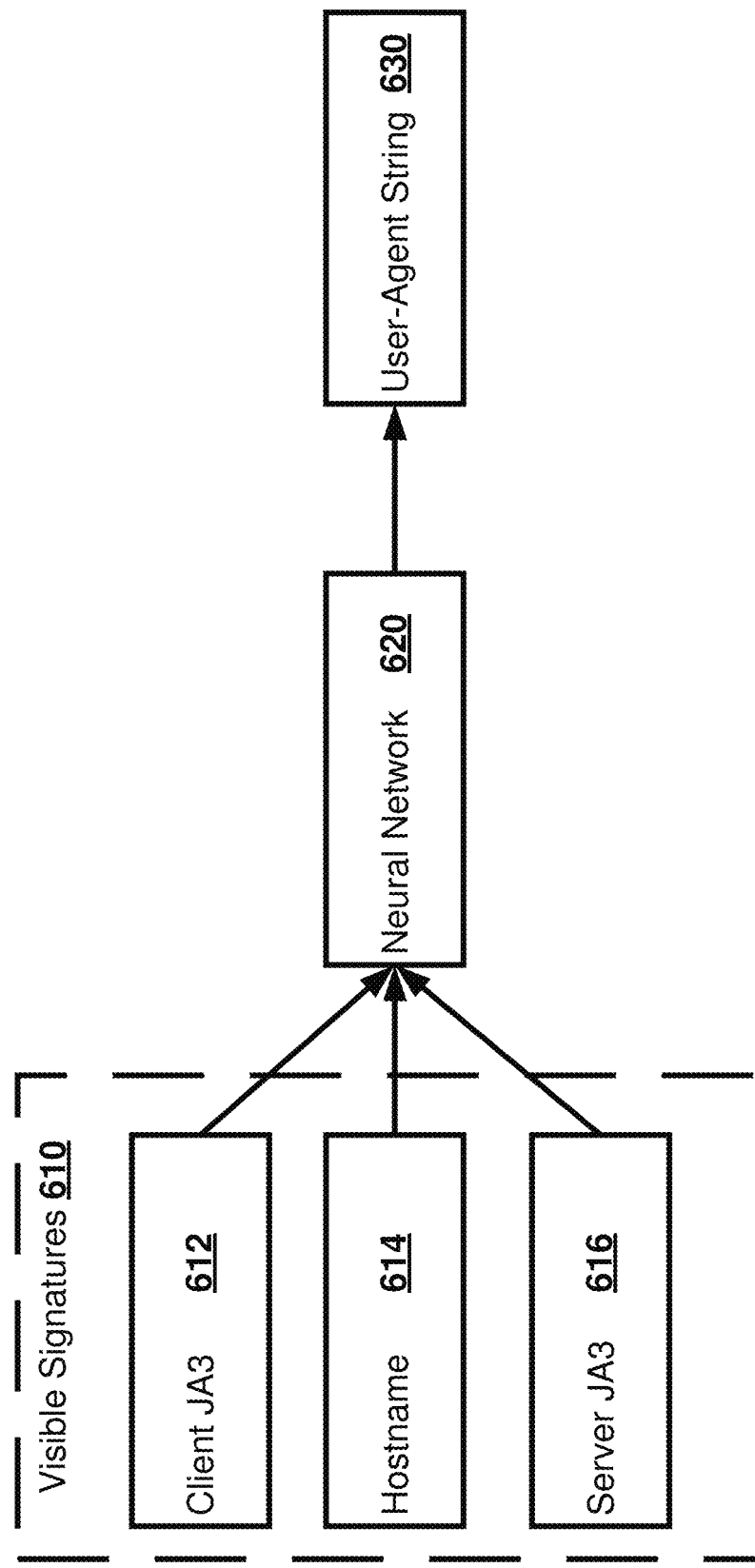
FIG. 6 illustrates a block diagram for an artificial intelligence classifier trained to predict a set of user-agents on a client device that normally will initiate at least encrypted connections with that endpoint.

An input module 610 (as shown in FIG. 6) in an analyzer module and/or in a cyber threat analyst module can enter as inputs the client hash, the hostname, and the server hash into an artificial intelligence (AI) classifier 620 trained to predict an identity of one or more user-agents on a client device that initiate or receive those connection protocol requests with that endpoint based on those inputs. A user-agent and/or its user-agent string (e.g. chrome v7/223140/CFnetwork/1128 Darwin/), is analyzed to determine whether the user agent normally initiates (or does not normally initiate) encrypted and/or unencrypted connection protocol requests with that endpoint outside the network (e.g. www.dropbox.com) being protected by the cyber security appliance 100. User agents that normally initiate connection protocol requests with that endpoint can generally be ruled out as a non-anomalous/not a suspicious user-agent. The data on user agents that normally will initiate encrypted and/or unencrypted connections with that endpoint outside the network can come from multiple sources, such as both i) user agents on that specific client device, such as laptop, smart phone, desktop computing device, as well as ii) data collected from the user agents from all of the networked devices protected by an entire fleet of cyber security appliances.

A cyber threat module can identify whether activity, including the connection protocol requests, associated with the user-agent string corresponds to a cyber threat to the client device.

An autonomous response module can execute at least one or more autonomous responses to mitigate the cyber threat identified by the cyber threat module, such as shutting down the communication connection between the anomalous/suspicious user-agent and an IP address used by the endpoint.

The cyber threat module can also identify an attempt to access a potentially malicious web server as the cyber threat based on the user-agent string. Note, the user-agent string can identify the user agent on a client device executing the access of an IP address of the malicious web server. The cyber threat module can cooperate with an AI classifier 620 trained to predict user agents that normally will initiate encrypted connections with the endpoint outside the network to remove a set consisting of the predicted user agents that normally will initiate encrypted connections with the endpoint in order to reveal when a suspicious user agent, which does not normally initiate encrypted connections (or even unencrypted) with the endpoint outside the network, but now is attempting to initiate the encrypted connection with the endpoint. Thus, each user agent that normally (e.g. routinely/regularly/often) accesses a hostname of an endpoint can be eliminated as a candidate to be a suspicious user agent under analysis. Therefore, the cyber threat module is configured to cooperate with the AI classifier 620 trained to predict user agents that normally will initiate encrypted connections with the endpoint outside the network to remove a set consisting of the predicted user agents that normally will initiate encrypted connections with the endpoint in order to reveal when a suspicious user agent that does not normally initiate encrypted connections with the endpoint outside the network but now is attempting to initiate the encrypted connection with the endpoint.

Therefore, the cyber threat module can recognize an attempt to initiate a protocol connection request to the endpoint by the user agent, under analysis, that does not normally make this protocol connection, is unusual and/or suspicious; and thus, a potential cyber threat. Again, this is based on what user-agent is attempting to initiate the protocol connection request to the IP address of the endpoint, under analysis. User agents that normally connect to that IP address of the endpoint would not be considered as a possible cyber threat but other user agents that do not normally connect to that IP address could be a cyber threat. The endpoint could be a known malicious web server and/or just a set of IP addresses that could be associated with the malicious web server.

Figure 8:
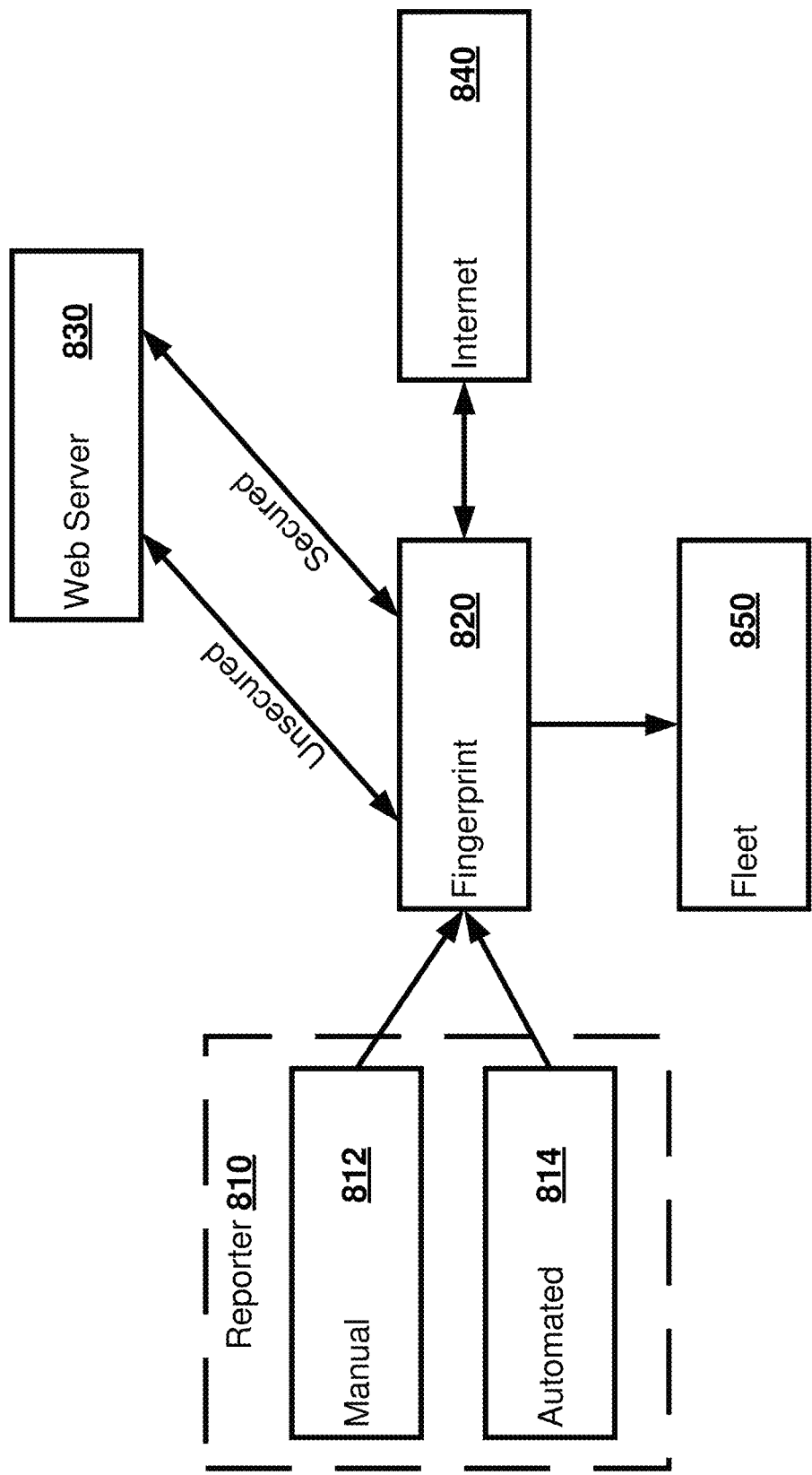
FIG. 8 illustrates a block diagram of a fingerprint module working with the other modules and the central system.

Next, a fingerprint module 820 (as shown in FIG. 8) in the cyber threat module can receive from the analyzer module and/or cyber threat analyst module the hostname, such as a server name for a malicious web server (e.g. www.dropbox-.com) in order to 1) create an unencrypted target fingerprint based on intransient characteristics (e.g. consistent connection header information, server characteristics, etc.) of the known malicious web server gleaned from sending a series of unencrypted connection protocol requests, 2) to create an encrypted target fingerprint for the known malicious web server based on sending a series of encrypted secure connection protocol requests, and 3) to build a combined web server fingerprint for the malicious web server (e.g. server fingerprint) from the combined encrypted target fingerprint and the unencrypted target fingerprint. In an example, the unencrypted target fingerprint can initiate two or more requests from distinct source IP addresses at different times. This ensures that temporally varying and client specific response headers such as time fields or cookies, respectively, can be identified. Header keys and their values which remain constant between the responses can be example characteristics of interest and are termed "intransient". In addition to the headers, some other example characteristics of interest can include the status code, final URL after redirects and HTML title (if present). In the case of transient headers—the keys can still be utilised to make a "header keys" hash which examinable with the "intransient header" hash. All of these can be part of the intransient characteristics of the malicious web server forming the encrypted target fingerprint.

Figure 10:
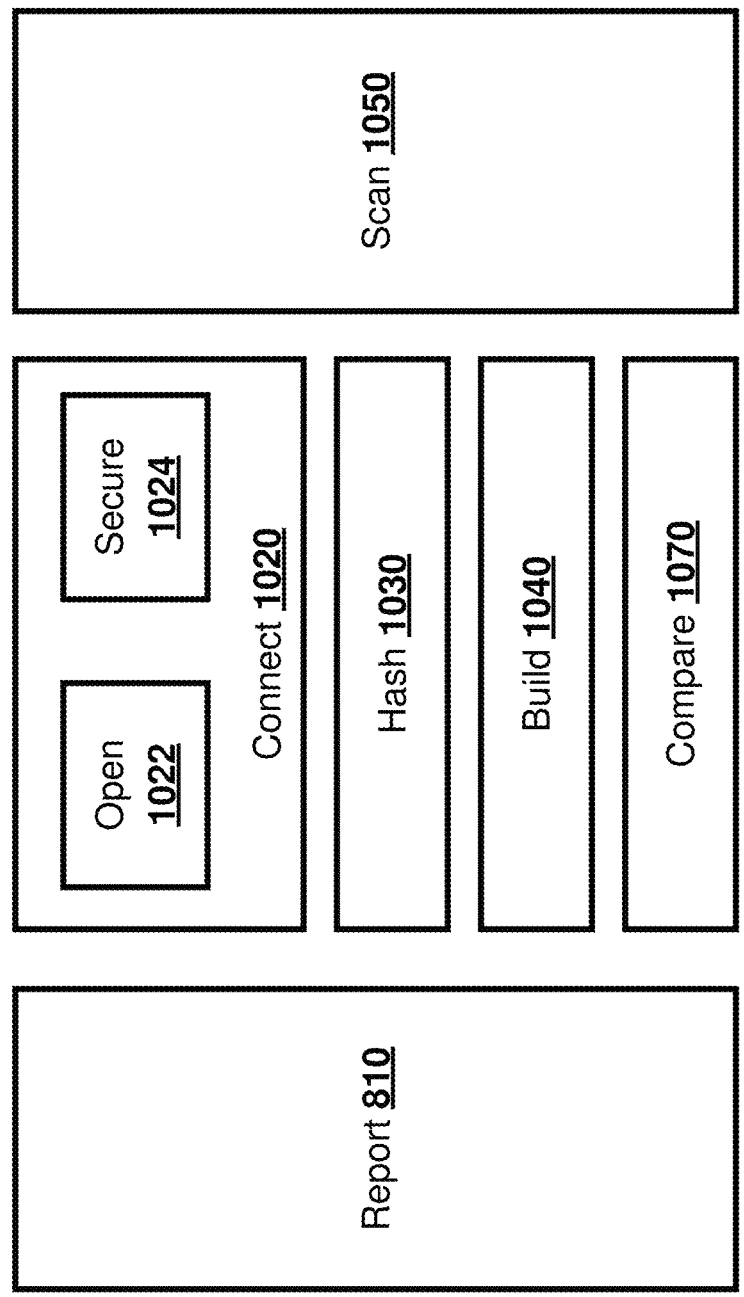
FIG. 10 illustrates a block diagram of an embodiment of a fingerprint module.

Next, the fingerprint module 820 in the cyber threat module can include some individual components including a report sub-module 810, a connection sub-module 1020, a hash sub-module 1030, a build sub-module 1040, a scan sub-module 1050, and a comparator sub-module (as shown in FIG. 10). Note, the cyber analyst module and/or analyzer module can also include one or more of these sub modules.

A report sub-module 810 can receive a hostname (such as an endpoint IP address, a server name, etc.) for a known malicious web server in order to identify, for example, a new set of IP addresses/endpoints associated with this previously known malicious web server.

A connection sub-module 1020 can be coded to send a series of unencrypted connection protocol requests to the malicious web server in order to obtain the intransient characteristics of the malicious web server as well as to send a series of encrypted secure connection protocol requests to the malicious web server in order to obtain characteristics of secure communications with the malicious web server. The connection sub-module 1020 can vary source identifiers of the user agent and/or user device initiating the connection protocol requests for the series of unencrypted connection protocol requests to the malicious web server to obtain different host data from the malicious web server to build up the unencrypted fingerprint. The connection sub-module 1020 can also utilize a proxy service to vary the source identifiers for the series of unencrypted connection protocol requests to obtain additional characteristics of the malicious web server. The unencrypted connection protocol requests can be in internet protocol communications, such as HTTP, TCP/IP, FTP, UDP/IP, etc. The encrypted connection protocol requests can be in internet protocol communications, such as HTTPS. The connection sub-module 1020 can cooperate with the comparator sub module to analyze tendencies of user agents and their normal connection pattern to a set of endpoints each user agent communicates with. The comparator sub module can determine, measured against a threshold amount) when the connection pattern to a particular endpoint IP address by a particular user agent under analysis is atypical/not normal with regard to other similar user agents, and then consider that user agent, under analysis, as suspicious when it attempts to establish a protocol connection with the particular endpoint IP address. Accordingly, the comparator sub module can cooperate with the artificial intelligence classifier trained to predict a user-agent 620 on a client device that normally will initiate at least encrypted connections with that endpoint in order to establish the threshold amount.

A hash sub-module 1030 can be coded to generate an unencrypted target fingerprint based on the intransient characteristics of the malicious web server gleaned from the series of unencrypted connection protocol requests. The hash sub-module 1030 can be coded to also generate an encrypted target fingerprint for the malicious web server based on the series of encrypted secure connection protocol requests. The hash sub module can cooperate with the connection sub-module 1020 to generate/enumerate a list and order of the preference for encryption ciphers used by a server for the malicious web server for the series of encrypted secure connection protocol requests to supply some of the characteristics of the malicious web server in the encrypted target fingerprint. Each time a secure connection protocol request is made the encryption cipher offered by the malicious web server and/or suspicious IP address under analysis is noted. In addition, the module can note encryption ciphers already offered and request to use another encryption cipher in order to assist in creating the encryption cipher order. See FIG. 15 for an example embodiment of a connection sub-module 1020 generating the series of unencrypted connection protocol requests, such as HTTP connection protocol requests, so that the hash sub-module 1030 can glean characteristics of the malicious web server as well as generating the series of encrypted connection protocol requests, such as HTTPS connection protocol requests, to the malicious web server so that the hash sub-module 1030 can glean characteristics of the secure communications with the malicious web server.

A build sub-module 1040 can build a combined web server fingerprint for the malicious web server from both the intransient characteristics of the malicious web server from the unencrypted target fingerprint and the characteristics of the secure communications with the malicious web server from the unencrypted target fingerprint.

A comparator sub module 1070 can determine a set of one or more suspicious IP addresses that share a substantial similarity to information derivable from the combined web server fingerprint. A scan sub-module 1050 is coded to cooperate with the comparator sub module 1070. The scan sub-module 1050 is coded to generate a scan of IP addresses, such as a representational portion of devices (e.g. servers) on the Internet. The scan sub-module 1050 can cooperate with the comparator sub module 1070 such that the set of one or more suspicious IP addresses is created based on an amount of matches of shared characteristics over a threshold amount to information derived from the combined web server fingerprint for the malicious web server, which then indicates that each of the IP addresses put into the set of the one or more suspicious IP addresses are very likely to be associated with a previously known malicious web server. For example, a threshold amount of indicators can be a number (e.g. four or more) and/or a percentage (e.g. 70%) of i) the intransient characteristics of the malicious web server from the unencrypted target fingerprint and/or ii) the characteristics of the secure communications with the malicious web server from the encrypted target fingerprint match up with characteristics found in the suspicious IP address under analysis. The scanned IP addresses that are suspicious do not need to match up exactly to all of (e.g. 10 out of 10) the characteristics of the known malicious web server. However, the IP address that is suspicious shares a large enough number (6 out of 10) and/or percentage of characteristics that match up with the characteristics of the known malicious web server, such that this IP address under analysis is very likely associated with the known malicious web server. In addition, suspicious IP addresses can be added and/or removed based on a further human investigation into the set of suspicious IP addresses associated with a previously known malicious web server. Thus, the scan sub-module 1050 can cooperate with the comparator sub module to analyze characteristics of scanned IP addresses compared to characteristics of a known malicious web server.

The autonomous response module can cooperate with the fingerprint module 820 to inoculate a fleet of network devices against a cyberattack using the set of one or more IP addresses based on the combined web server fingerprint in order to preemptively alert the fleet of network devices to future sources of danger from the cyberattack from user agents attempting to establish a connection protocol request with to a suspicious IP address in the set of one or more IP addresses. The suspicious IP addresses have enough shared characteristics to very likely be associated with the previously known malicious web server.

The system for nominating potentially malicious connectivity can be triggered by a centralized anomaly detection web platform and then communicated back out to all of the cyber security appliances in communication with that centralized anomaly detection web platform. When communicated that will cause autonomous actions to be invoked preemptively to find anomalous/suspicious user agents that attempt to communicate with the suspicious IP addresses.

The autonomous response module can then also send the set of one or more suspicious IP addresses (and/or add/subtract to an existing set) to the fleet of cyber security appliances via the central platform. Each cyber security appliance 100 protects its own fleet of network devices.

The fingerprint module 820 when combined with the AI classifier can identify a user agent that is attempting to make a protocol connection that is abnormal/suspicious for that type of user agent, which makes the user agent under analysis likely to be malicious, and then when the user agent classified as abnormal/suspicious for the protocol connections it is attempting to initiate with any of the set of suspicious IP addresses, which were determined to be very likely associated with that previously known malicious web site, then this combination is very likely to be a cyber threat that should receive an autonomous response action to prevent that communication connection and brought to the attention of a human cyber analyst for further investigation. Thus, the autonomous response module will take an autonomous action to prevent a communication connection between a user agent deemed suspicious and the set of one or more suspicious IP addresses.

Thus, the scan sub-module 1050 can cooperate with the comparator sub module 1070 to determine when an amount of characteristics of a particular IP address under analysis matches up, over a threshold amount, to a known malicious web server, and then consider that IP address under analysis as suspicious. As discussed, the comparator sub module can cooperate with the autonomous response module to determine when a particular user agent deemed suspicious attempts to make a protocol connection with a particular IP address deemed as suspicious because of the amount characteristics in common with the known malicious web server. The autonomous response module can then autonomously prevent the protocol connection between the user agent deemed suspicious and the IP address deemed as suspicious because it is very likely that the user agent deemed as suspicious is a cyber threat.

Both the fingerprint module 820 and the AI classifier can identify zero day cyber threats on their own, which previously have not yet been identified as a known cyber threat. In an example, even a known malicious web server will morph itself to create new endpoint IP addresses used with that known threats in order to create a new zero day cyber threat.

The comparator sub module 1070 working with the AI classifier 620 trained to predict user agents can go through a deduction process to identify individual processes/user agents on a client device that attempt to communicate with an endpoint IP address that the vast majority of the processes/user agents on all of the other client devices making up a fleet of network devices for this organization's network do not normally attempt to establish a protocol connection with that endpoint IP address. Thus, by deduction and the process of elimination, this user agent under analysis is suspicious because of its abnormal behavior.

The AI classifier 620 trained to predict user agents that normally will initiate encrypted connections can generate these user agents and their set of normal endpoints they connect with. Through the removal of these user agents that normally will initiate encrypted connections with the set of endpoint IP addresses, then this reveals when an abnormal and thus suspicious user agent attempts to initiate an encrypted connection with an endpoint that it does not normally communicate with.

The modules of the cyber security appliance 100 can create a method of fingerprinting user agents/processes and endpoints that utilize data from a wide fleet of cybersecurity appliances to identify suspicious user agents and/or suspicious IP addresses through the fingerprint module 820 and/or AI classifier 620. These mechanisms can identify benign expected user agents, anomalous user agents, and previously unknown anomalous endpoints which may be associated with a known or unknown malicious process. The distribution methodology allows identifiers for processes or endpoints derived to be malicious to be rapidly distributed to a wider fleet of cyber security appliances, cascaded to connected probes or host-based agents, and automatically invoke autonomous actions.

The inoculation system of the autonomous response module can autonomously perform the distribution task to distribute the identifiers for user agents/processes and/or endpoints/IP address determined to be suspicious to the wider fleet of cyber security appliances, cascaded to connected probes or host-based agents, and automatically invoke other autonomous actions. The cyber security system can also gather and share this endpoint signature information across all of the network cyber security appliances from a central database of these signatures.

Access to the identity of the user agent within an encrypted TLS connection through a passive observance provides valuable, actionable information which would only have been accessible via Transport Layer Security (TLS) decryption methods, which are extremely computationally intensive. Additionally, when autonomous response module and/or central database distributes this information to the fleet of cyber security appliances as well as to endpoint collection agents, then that autonomous action saves a great amount of total computational power due to the distributed nature of the analysis. Thus, this design discussed herein saves a large amount of computations and time by not having to decrypt each encrypted communication in a network to get insight into what's going on inside in that encrypted communication in order to be able to determine whether a given user agent should be attempting to initiate an encrypted communication with an IP address within a set of IP addresses. Rather the design can create fingerprints and quickly and computationally efficiently compare the information within these fingerprints to determine whether a given user agent should be attempting to initiate an encrypted communication with an IP addresses within a set of IP addresses. The design supplies tools to detect a potential cyber threat before that malicious user agent has conducted a cyber attack and is only later identified and confirmed to be a malicious user agent. The design supplies tools to detect a potential IP address (even a set of IP addresses) associated with a cyber threat, such as a known bad/malicious web server even though this new IP address (even a set of IP addresses) has not yet been associated previously with that known bad/malicious web server.

The fingerprint module 820 and AI classifier 620 can combine to correlate an endpoint, a 'fingerprint,' and a tendencies of a user-agent that accessed the endpoint. The modules of the cyber security appliance 100 can cooperate with each other to identify malware by looking for combinations of endpoints and agents on a client device.

Example user agents can be a software agent or resident process that is acting on behalf of a user on a device, such as a web browser that "retrieves, renders and facilitates end user interaction with Web content, an email reader, an operating system, an application, etc. However, the user agent may also be malware software not acting on behalf of or at the request of a user. Thus, example user agents can include: (i) a browser, (ii) an application or an operating system of a client device, (iii) a proxy device and/or process, (iv) a legitimate process initiating communication, and/or (v) malware software.

The fingerprint module 820 and AI classifier 620 can make use of JA3 hashes. Note, JA3 can be a methodology for connection fingerprinting by creating a hash of, for example, 5 decimal fields of the Client Hello message sent in the initial stages of a TLS/Secure Socket Layer (SSL) session. A secure/encrypted protocol such as Hypertext Transfer Protocol (HTTP) Secure (HTTPS) can establish a TLS/SSL session.

The cyber security appliance 100 identifies malware software by using the AI classifier 620 configured to receive an input of JA3 hashes and hostnames and configured to output a likely user agent. In an example, the artificial intelligence (AI) classifier 620 can be trained to correlate combinations of i) a hostname of an endpoint outside the network, ii) a server JA3 'fingerprint' and iii) a client JA3 agent on a client computing device that accessed the endpoint outside the network to create a method to identify malicious software on an endpoint computing device. The AI classifier 620 can be trained with supervised learning prior to deployment and then unsupervised learning when deployed.

The analyzer module may apply the trained AI classifier to predict a user agent 620 to accurately match a JA3 hash to particular user agents in an enterprise immune system. The modules of the cyber security appliance 100 attempt to identify malware by looking for combinations of endpoints and agents on a client device. A typical client device can be an employee's laptop computer, desktop computer, smart phone, etc. An example endpoint outside the network can be a firewall, Domain Name System (DNS) server, a web server, Uniform Resource Locator (URL), a domain, etc.

A user agent, whether benign or malicious, tends to connect to a low number of unique endpoints. When an endpoint is classified as potentially malicious, such as through a model breach, details of the endpoint along with the JA3 hash of the client device that accessed the endpoint are sent up to the database system for the cyber security system.

The inoculation system in the autonomous response module can deploy active measures to identify a potentially malicious endpoint when a user agent attempts to make an encrypted protocol connection (e.g. SSL connection) to the endpoint. As part of that encrypted connection protocol request, the connection sub-module 1020 of the initiator device and the server negotiate over the encryption ciphers used for the connection. The hash sub-module 1030 creates a hash of ciphers from the SSL connection for this initiator client device and the server connecting to the endpoint negotiation. The hash sub-module 1030 hashes the response from the server to this encrypted connection protocol request. The connection sub-module 1020 also initiates an encrypted connection protocol request such as an HTTP request, and then the hash sub-module 1030 hashes the response from the server to this HTTP request. Those two hashes, or "fingerprints", are combined together to make a combined web server fingerprint of the endpoint.

A dataset of known JA3 client hashes, known JA3 server hashes, hostnames, and known user agents, can be used with a machine learning approach that is usually implemented for a feed forward neural network (FFNN). In an example, the AI classifier 620 trained to predict user agents can use a FFNN with natural language processing (NLP) in order to train the AI classifier 620 trained to predict user agents. The training can use a set of known data from the SSL connection to supply JA3 hashes and hostnames and the HTTP connection to supply user agent information as input data and output data. In the training, the JA3 hashes for the client and the server in connection with hostname information can be accurately matched to the initiating user agent information.

The AI classifier 620 can be trained on data retrieved from a fleet of cyber security appliances each installed in its own network to examine connection data, including connection data from a proxy service. In an example, when a proxy is in use, an analysis of the HTTP connection can be analysed to determine interactions with the communication before the SSL process. Using the HTTP connect information prior to the SSL process, the system can map or graph user agents and JA3 hashes for the same connection as well as supply this data for training. The AI classifier 620 is trained on this data containing user agents matched to JA3 hashes and hostnames.

In the field when deployed, the AI classifier performs an analysis of JA3 hashes and their associated user-agents when monitoring and analysing a secured communication connection. Once trained and then deployed in the field, the AI classifier 620 trained to predict user agents takes an input of JA3 hashes and hostnames determined from SSL connections and outputs a likely user agent initiating the connection. In the field when deployed, this AI classifier 620 trained to predict user agents takes an input of an unknown JA3 client hash, an unknown JA3 server hash, and a hostname, and then outputs the most likely user agent and a confidence score. The JA3 hash information and hostname information are derived from the SSL connection and the user agent information is derived from the HTTP (for the training process).

Again, the AI classifier 620 trained to predict user agents analyses JA3 hashes and hostname information to correlate or predict their associated user agents from an SSL connection. This method is a supervised machine learning approach to predict the likely process, such as a user agent, initiating a connection based upon i) the hostname and ii) JA3 hashes seen in the SSL connection. The SSL connections generally do not show a user agent, and JA3 hashes from a TLS/SSL session suffer from being rare, rather than unique,—many processes can produce the same JA3.

After training, then the AI classifier 620 trained to predict user agents when deployed can give an output of a predicted user agent, after examining the inputs of JA3 hashes and hostnames obtained from the connection from the SSL. For example, based on the JA3s and hostnames from the SSL connection, the AI classifier 620 outputs the predicted user agent, which for example, could be a 65% chance that the connection's user's agent was a McAphee endpoint agent. The AI classifier 620 trained to predict user agents can be an internal-only analyst tool and could be implemented as a customer-facing tool into the core of the cyber security appliance.

JA3 hashes can be used to identify the signatures of specific processes communicating with endpoints using SSL/TLS protocol.

In general, without the AI classifier 620 trained to predict user agents, when a JA3 hash is entered as an input into a search component, the search component will output that many different possible 'processes' in the hash that could be the user agent—e.g. the i) browser e.g. Google Chrome, ii) an application or operating system on another user's device, iii) a proxy device/process, iv) a legitimate process initiating the communication, or v) an actual malware software. Many processes can interact with the communication from the user agent initiating the connection and generation of the communication through a same API to receipt of the communication in the end device in the organization's network.

In an example, the AI classifier 620 trained to predict user agents in the cyber security appliance correlates elements of a connection together in the platform's advanced search component—where a proxy is in use, the cyber security appliance observes the initial HTTP_CONNECT negotiation (contains a user agent) and the TLS connection (JA3 hashes and hostname). Using this correlated data, for training, it was possible to create a dataset of user agents, JA3 hashes (client and server) and hostnames being accessed across a fleet of cyber security appliances. The user agent in general identifies the client software originating the request. The user agent operates in a network protocol, it can often identify itself, its application type, operating system, software vendor, or software revision, by submitting a characteristic identification string in a header of its communication to its operating peer. For the AI classifier, the user agent can be simplified to the software name and Operating System version, where applicable typically stripping out ultra-specific version information. This is an important approach to gathering this dataset—in contrast, another implementation attempting to identify all possible user agents for a JA3 hash requires the user to navigate to an endpoint in their browser or running an endpoint agent, which monitors outgoing connections and is therefore heavily limited.

In general, the AI-based cyber security appliance 100 sees something abnormal or suspicious, then the cyber threat analyst module forms one or more hypotheses on what are the possibilities to cause this abnormal behavior or suspicious activity, then the cyber threat analyst module finds evidence/collects additional data to support or refute each possible hypothesis, and then generates a formal report.

Referring back to FIG. 1, various Artificial Intelligence models and modules of a cyber security appliance 100 cooperate to protect one or more networks under analysis from cyber threats. The AI-based cyber security appliance 100 may include a trigger module, a gatherer module, an analyzer module, a comparison module, a cyber threat analyst module, an assessment module, a formatting module, one or more AI models trained with machine learning on a normal pattern of life in entities in the network under analysis, one or more AI models trained with machine learning on cyber threat hypotheses to form and investigate a cyber threat hypothesis on what are a possible set of cyber threats and their characteristics, symptoms, remediations, etc., and one or more AI models trained on possible cyber threats, one or more AI models trained on how to conduct investigations, one or more rule-based, a data store, an autonomous response module, a 1st domain module, a 2nd domain module, and a coordinator module.

The analyzer module has one or more data analysis processes to cooperate with one or more AI classifiers in an assessment module by producing features for the AI classifiers. The data analysis processes can be algorithms/scripts written by humans to perform their function discussed herein; and can in various cases use AI classifiers as part of their operation.

A cyber threat analyst module can use i) one or more AI models to form and investigate cyber threat hypotheses, ii) a set of scripts to form and investigate cyber threat hypotheses, iii) rules-based models, and iv) any combination of both, to form and investigate cyber threat hypotheses on what are a possible set of cyber threats. The cyber threat analyst module forms and investigates hypotheses on what are a possible set of cyber threats can use any of i) the one or more AI models to form and investigate hypotheses trained with supervised machine learning on human-led cyber threat investigations and then steps, data, metrics, and meta data on how to support or to refute the cyber threat hypotheses on what are a possible set of cyber threats, ii) the set of scripts to form and investigate cyber threat hypotheses to aid in how to form the hypotheses on what are a possible set of cyber threats and then the steps, data, metrics, and meta data to collect additional system data points to support or to refute the possible cyber threat hypotheses, and iii) any combination of both.

A cyber threat analyst module is configured to form and investigate cyber threat hypotheses on what are a possible set of cyber threats. The cyber threat analyst module to form and investigate hypotheses on what are a possible set of cyber threats cooperates with the analyzer module with the one or more data analysis processes to conduct an investigation on a possible set of cyber threats hypotheses that would include at least one of i) the abnormal behavior, ii) the suspicious activity, and iii) any combination of both, identified through cooperation with the one or more AI models trained with machine learning on the normal pattern of life in the system.

The gatherer module may cooperate with the cyber threat analyst module and/or the analyzer module to collect data to support or refute each of the one or more possible cyber threat hypotheses that could include this abnormal behavior or suspicious activity by cooperating with the cyber threat hypotheses to form and investigate hypotheses on what are a possible set of cyber threats.

The gatherer module may further extract data at the request of the cyber threat analyst module on each possible hypothetical threat that would include the abnormal behavior or suspicious activity and then filter that collection of data down to relevant points of data to either 1) support or 2) refute each particular hypothesis of what the cyber threat, the suspicious activity and/or abnormal behavior relates to. The gatherer module collects data to support or refute each of the one or more possible cyber threat hypotheses that could include this abnormal behavior or suspicious activity.

The gatherer module cooperates with a data store. The data store stores comprehensive logs for network traffic observed. These logs can be filtered with complex logical queries and each Internet Protocol (IP) packet can be interrogated on a vast number of metrics in the network information stored in the data store.

The data store can store the metrics and previous threat alerts associated with network traffic for a period of time, which is, by default, at least 27 days. This corpus of data is fully searchable. The cyber security appliance 100 works with network probes to monitor network traffic and store and record the data and meta data associated with the network traffic in the data store. Examples of domains/networks under analysis can include any of i) an Informational Technology (IT) network, ii) an Operational Technology network, iii) a Cloud service, iv) a SaaS service, v) an endpoint device, and vi) email. A first domain module can be an IT network module configured to receive information from and send information to, in this example, IT network-based sensors (i.e. probes, taps, etc.) The first domain module also has algorithms and components configured to understand, in this example, IT network parameters, IT network protocols, IT network activity, and other IT network characteristics of the network under analysis. A second domain module is in this example an email module. A second domain module can be an email network module configured to receive information from and send information to, in this example, email-based sensors (i.e. probes, taps, etc.) The second domain module also has algorithms and components configured to understand, in this example, email parameters, email protocols and formats, email activity, and other email characteristics of the network under analysis. The coordinator module is configured to work with various machine learning algorithms and relational mechanisms to assess and annotate or position in a vector diagram activity including events occurring in the first domain compared to activity including events occurring in the second domain. The domain modules can cooperate to exchange information with the data store.

The gatherer module may consist of multiple automatic data gatherers that each look at different aspects of the data depending on the hypothesis formed for the analyzed event. The data relevant to each type of possible hypothesis can be automatically pulled from additional external and internal sources. Some data is pulled or retrieved by the gatherer module for each possible hypothesis.

A feedback loop of cooperation between the gatherer module, the analyzer module, one or more models trained on different aspects of this process, and the cyber threat analyst module exists to gather information to determine whether a cyber threat is potentially attacking the networks/domains under analysis.

The analyzer module can cooperate with the one or more Artificial Intelligence models trained with machine learning on the normal pattern of life for entities in a network under analysis to detect, in this example, anomalous emails which are detected as outside the usual pattern of life for each entity, such as a user, email server, etc., of the email network. The analyzer module can cooperate with the one or more Artificial Intelligence models trained with machine learning on the normal pattern of life for entities in a second domain's network under analysis to detect, in this example, anomalous network activity by user and/or devices in the network, which is detected as outside the usual pattern of life for each entity, such as a user or a device, of the second domain's network under analysis.

In this example, the analyzer module can cooperate with the Artificial Intelligence models trained on potential email cyber threats to detect suspicious emails that exhibit traits that may suggest a malicious intent, such as phishing links, scam language, sent from suspicious domains, etc. The analyzer module can also cooperate with the Artificial Intelligence models trained on potential IT based cyber threats to detect suspicious IT links, URLs, domains, user activity, etc. that may suggest a malicious intent.

The analyzer module uses one or more data analysis processes to produce features for the AI classifiers in the assessment module including i) an agent analyzer coded to analyze user agent/resident process data and detect the cyber threat, such as a malicious agent, previously unknown to the system, using, for example, an 1) analysis of JA3 hashes when monitoring and analyzing a secured communication connection without needing to decrypt communications to figure out what the content is and what the content in network traffic or 2) an analysis of user agent/resident process data when monitoring and analyzing an unsecured communication connection; ii) an Ngram data analysis process coded to assess an address string under analysis to determine the address string's 1) similarity to or 2) anomaly from known good and bad populations of address strings; iii) an exfiltration data analysis process coded to identify and correlate 1) data transfers to one or more online services as well as 2) data transfers to one or more other external network locations when multiple different IP addresses exist for that online service or that other external network location; and iv) a network scan data analysis process coded to create a virtual tree of IP address space. Similarly, the analyzer module can use one or more of the above four data analysis processes to determine or otherwise obtain a collection of additional system data points to either support or refute the one or more possible cyber threat hypotheses.

The AI classifiers can be part of the assessment component, which scores the outputs of the analyzer module. The AI classifier can be coded to take in multiple pieces of information about an entity, object, or thing and based on its training then output a prediction about the entity, object, or thing. Given one or more inputs the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series of correlated anomalies under analysis.

The analyzer module with one or more data analysis processes cooperates with one or more AI models trained with machine learning on the normal pattern of life in the system, to identify at least one of i) the abnormal behavior, ii) the suspicious activity, and iii) the combination of both, from one or more entities in the network/domain being modeled by that AI model.

An assessment module with AI classifiers cooperates with one or more AI models trained on possible cyber threats to assign a numerical assessment of a given cyber threat hypothesis that was found likely to be supported by the analyzer module with the one or more AI classifiers, via the abnormal behavior, the suspicious activity, or the collection of system data points.

A formatting module formats, presents, and outputs one or more supported possible cyber threat hypotheses as well as one or more refuted possible cyber threat hypotheses from any of the analyzer module and the assessment module into a formalized report, from one or more templates of a plurality of report templates, that is outputted for a human user's consumption in a medium of any of 1) printable report, 2) presented digitally on a user interface, 3) in a machine readable format for further use in machine-learning reinforcement and refinement, or 4) any combination of the three.

i) Malicious Agent Detection Based on JA3 Hashes for a Secured Connection

In an embodiment, the analyzer module may use the agent analyzer to detect a potentially malicious agent previously unknown to the system using 1) the analysis of JA3 hashes when monitoring and analyzing a secured connection, such as HTTPS, Secure Shell (SSH), etc., without needing to decrypt the data/content carried in the network traffic and/or 2) an analysis of user agent data when monitoring and analyzing an unsecured connection, such as HTTP, factoring in at least how rare is it for i) a process, ii) a device, or iii) both to connect to that connection from this network. (For example, see an example network in FIG. 4 being protected by the AI based cyber security appliance 100).

Figure 2:
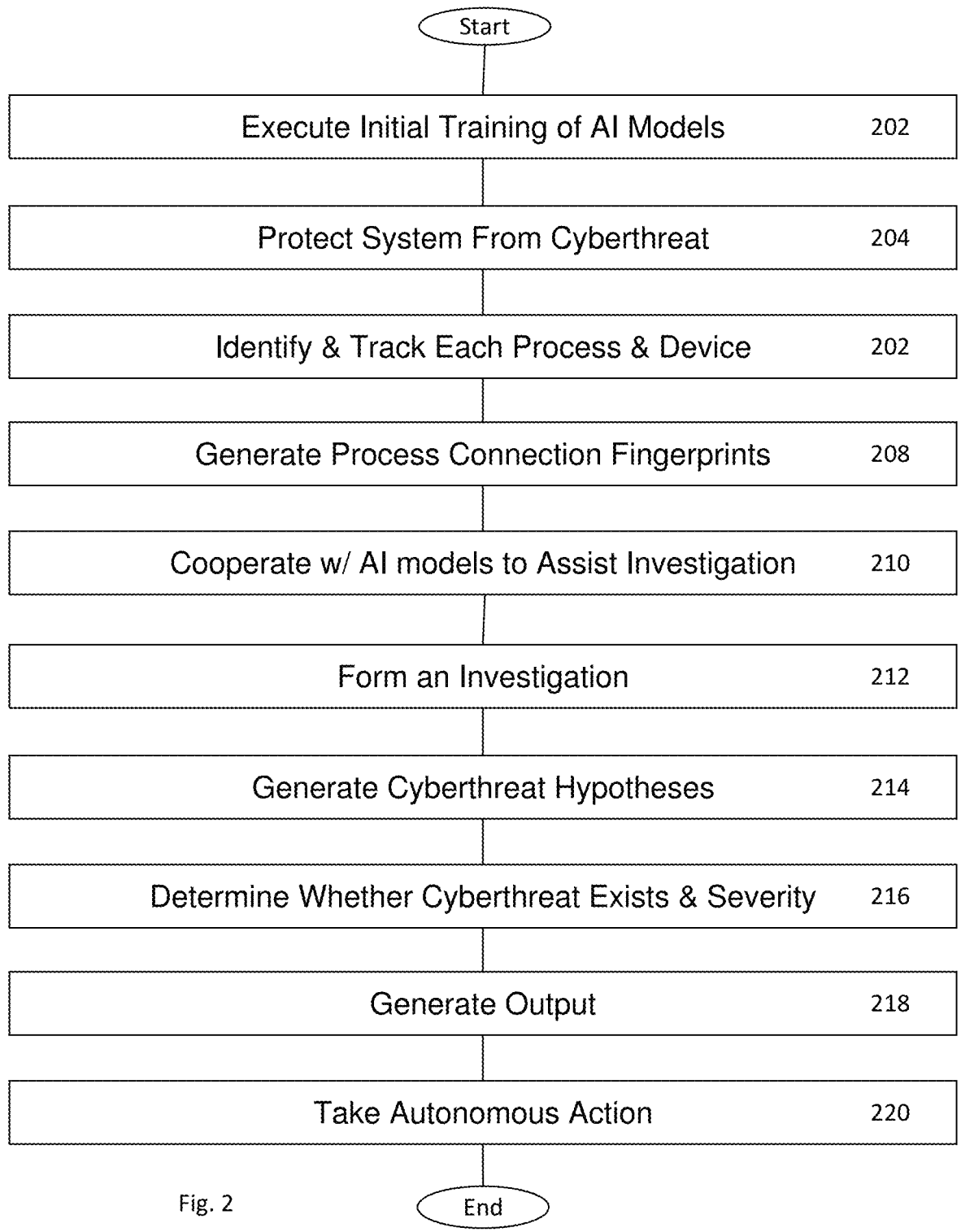
FIG. 2 illustrates a flowchart of an embodiment of a method for identifying cyber threats including malicious behavior.

FIG. 2 illustrates a flowchart of an embodiment of a method for identifying cyber threats including malicious behavior. The cyber security service may execute an initial training of Artificial Intelligence models on cyber threats using unsupervised learning and/or supervised learning on characteristics and attributes of known potential cyber threats including malware, insider threats, and other kinds of cyber threats that can occur within that domain (Block 202). The AI model learns at least both in the pre-deployment training i) exact characteristics and attributes of known potential cyber threats as well as ii) a set of characteristics and attributes of each category of potential cyber threats and their weights assigned on how indicative certain characteristics and attributes correlate to potential cyber threats of that category of threats. Later, when in deployment in a domain/network being protected by the cyber security appliance 100, the AI model can potentially determine whether a potential unknown threat has been detected via numerous techniques including an overlap of some of the same characteristics and attributes in that category of threats. The AI models trained with machine learning on possible cyber threats use at least one or more supervised machine learning algorithms during pre-deployment training such as Linear Regression, Regression Trees, Non-Linear Regression, Bayesian Linear Regression, Deep learning, etc.

Likewise, pre-deployment machine learning training of one or more Artificial Intelligence models trained on a normal behavior of the system can occur. Initial training of one or more Artificial Intelligence models trained with machine learning on a behavior of the pattern of life of the network can occur where each type of network and/or system will generally have some common typical behavior with each model trained specifically to understand components/devices, protocols, activity level, etc. to that type of network/system/domain. What is normal behavior can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each entity's behavior changes and will be reflected with unsupervised learning in the model such as various Bayesian techniques, clustering. The models can be implemented with various mechanisms such as neural networks, decision trees, etc. and combinations of these. Likewise, one or more supervised machine learning AI models are trained to create possible hypotheses and perform cyber threat investigations on agnostic examples of past historical incidents of detecting a multitude of possible types of cyber threat hypotheses previously analyzed by human cyber threat analysis. More on the training of AI models are trained to create one or more possible hypotheses and perform cyber threat investigations will be discussed later.

As discussed in more detail below, the analyzer module can cooperate with the one or more unsupervised machine learning models trained on the normal pattern of life to perform anomaly detection against the actual normal pattern of life for that system to determine whether the identified abnormal behavior and/or suspicious activity is malicious or benign. In operation of the cyber security appliance 100, when the potential cyber threat is previously unknown, and correctly identified as malicious or benign, then the AI models trained with machine learning on possible cyber threats update their training. As discussed, as the cyber security appliance 100 continues to operate, then the one or more machine learning models trained on a normal pattern of life are updated and trained to this system with unsupervised machine learning algorithms. The analyzer module can use any number of data analysis processes (discussed more in detail below and including the agent analyzer data analysis process here) to help obtain system data points so that this data can be fed and compared to the one or more machine learning models trained on a normal pattern of life, as well as the one or more machine learning models trained on potential cyber threats, as well as create and store data points with the connection fingerprints.

The training and use of the AI classifier trained to predict user agents has been previously discussed.

All the above AI models and AI classifiers can continually learn and train with unsupervised machine learning algorithms on an ongoing basis when deployed in their system that the cyber security appliance 100 is protecting.

Next, as discussed further below, during pre-deployment the analyzer module uses data analysis processes and cooperates with AI models trained on forming and investigating hypotheses on what are a possible set of cyber threats. In addition, another set of AI models is trained on how to form and investigate hypotheses on what are a possible set of cyber threats and steps to take in supporting or refuting hypotheses. The AI models trained on forming and investigating hypotheses are updated when correctly supporting or refuting the hypotheses including what additional collected data proved to be the most useful.

Similarly, during deployment, the data analysis processes (discussed herein) used by the analyzer module can use unsupervised machine learning to update the initial training learned during pre-deployment, and then update the training with unsupervised learning algorithms during the cyber security appliance 100's deployment in the system being protected when various different steps to either i) support or ii) refute the possible set of cyber threats hypotheses worked better or worked worse.

Next, the cyber security appliance 100 with the AI based cyber security system may protect a system, from a cyber threat (Block 204). In an embodiment, the cyber security appliance 100 can protect all the devices on the network by monitoring network activity, such as, for example, network traffic going to and from the devices on the network. The functionality and components that perform the steps below have been discussed with regard to FIG. 1.

In general, the analyzer module and/or cyber threat analyst module cooperates with the cyber threat module including the fingerprinting module and the AI classifier 620 trained to predict user agents and the AI models trained on cyber threats to determine whether the abnormal behavior and/or suspicious activity is either 1) malicious or 2) benign when the potential cyber threat under analysis is previously unknown to the cyber security appliance 100. The analyzer module and cyber threat module cooperate with the AI models trained on a normal behavior of entities in the network under analysis. The analyzer module and cyber threat module cooperate with various AI-trained classifiers. With all of these sources, when they input information is at least one of that a potential cyber threat is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat. An input from the cyber threat analyst module of a supported hypothesis of a potential cyber threat will trigger the analyzer to compare, confirm, and act on that cyber threat. In contrast, the cyber threat analyst module investigates subtle indicators and/or initially seemingly isolated unusual or suspicious activity such as a worker is logging in after their normal working hours or a simple system misconfiguration has occurred. Most of the investigations conducted by the cyber threat analyst module on unusual or suspicious activities/behavior may not result in a cyber threat hypothesis that is supported but rather most are refuted or simply not supported. The cyber threat analyst module may also report here is the incident and some potentially related events that could be further investigated by an actual human cyber security analyst. Typically, several rounds of data gathering to support or refute the long list of potential cyber threat hypotheses formed by the cyber threat analyst module will occur before the algorithms in the cyber threat analyst module will determine whether a particular cyber threat hypothesis is supported, refuted, or needs further investigation by a human. The rounds of data gathering will build chains of linked low level indicators of unusual activity along with potential activities that could be within a normal pattern life for that entity to evaluate the whole chain of activities to support or refute each potential cyber threat hypothesis formed. (See for example FIG. 3 and a chain of linked low level indicator all under a 50 on a threat indicator score). The investigations by the cyber threat analyst module can happen over a relatively long period of time.

A data gatherer module may have a process identifier classifier (Block 206). The process identifier classifier can identify and track each process and device in the network, under analysis, making communication connections. A data store cooperates with the process identifier classifier to collect and maintain historical data of processes and their connections, which is updated over time as the network is in operation. In an example, the process identifier classifier can identify each process running on a given device along with its endpoint connections, which are stored in the data store.

The hash sub module 1030 can cooperating with the process identifier classifier to apply a JA3 hash function to network traffic transiting over a secure communication connection, like HTTPS, between network components and/or perform an analysis of user agent data to network traffic transiting over an unsecure communication connection, like HTTP, in order to generate the 'target fingerprints (Block 208).' The agent analyzer data analysis process can be configured to compute JA3 hashes and analyze user agent data, every time a communication connection happens in order to calculate the 'target fingerprints' derived from the user agent data and/or JA3 data. The process identifier classifier cooperating with the agent analyzer data analysis process may apply the JA3 hash function to network traffic transiting over the secure communication connection and/or perform an analysis of user agent data to network traffic transiting over the unsecure communication connection to generate the target fingerprints, which can also be stored in the data store. The target fingerprints contain multiple characteristics of the endpoint connection.

Let's take the following JA3 hash for example: 3e860202fc555b939e83e7a7ab518c38. According to one of the public lists that maps JA3s to applications, this JA3 hash is associated with the 'hola_svc' application. This Hola VPN solution is identified as non-compliant in most enterprise networks. On the other hand, the following hash is associated with the popular messenger software Slack: a5aa6e939e4770e3b8ac38ce414fd0d5. Traditional cyber security tools can use these hashes like traditional signatures to search for instances of them in data sets or trying to blacklist malicious ones. As discussed, the hash sub module 1030 may, for example, create JA3 hashes for every encrypted (e.g. TLS/SSL) connection it encounters and then adds in additional endpoint connect details to create the encrypted target fingerprint. This is incredibly powerful in several ways. First, the JA3 can add invaluable context to a threat hunt. Second, the data store can also be queried to see if a particular JA3 was encountered in the network; thus, providing actionable intelligence during incident response when JA3 Indicators of Compromise (IoCs) are known to the artificial intelligent based analyst assisting incident responders. Moreover, the processes identified based on their JA3 can then be assessed for maliciousness. Note, this isn't done by checking the JA3 against a known blacklist but by passing various properties of the activity of that process to the AI classifier 620. Note, hackers try to evade simple JA3 signature detection by changing that signature so often a new piece of malware may have a different JA3 signature than previously cataloged but not all of the characteristics of the web server will change. The current method can be used in addition to a method that blacklists known malware signatures. The new process connection fingerprints contain multiple characteristics of the endpoint connection, which can be cross referenced as part of the connection fingerprint when one or more aspects change from a previous JA3 fingerprint.

In an example, user agent identification can be as follows. When a software agent operates in a network protocol, it often identifies itself, its application type, operating system, software vendor, or software revision, by, submitting a characteristic identification string to its operating peer. In HTTP, Session Initiation Protocol (SIP), and Network News Transfer Protocol (NNTP) protocols, this identification is transmitted in a header field. For example, user-agent bots, such as Web crawlers, often also include a URL and/or e-mail address so that the Webmaster can contact the operator of the bot.

In an alternate example, one of the domain modules can collect, from one or more probes deployed to one or more network devices, connection protocol requests having a source hash based on a user agent on a client device initiating access, an endpoint name, and a server hash based on the endpoint. The source hash can be a JA3 client hash and the server hash can be a JA3 server hash. The analyzer module can enter as inputs the source hash, the endpoint name, and the server hash into an artificial intelligence classifier trained to predict a user-agent string identifying a user agent application on a client device based on those inputs. The cyber threat module can identify whether activity associated with the user-agent string corresponds to a cyber threat to the client device. The cyber threat module can identify an access of the malicious web server as a cyber threat based on the user-agent string identifying the user agent application executing the access of the malicious web server. For example, if an application, such as a calculator application, initiates an atypical access to a web server such as Dropbox that may be a sign that the calculator application has been corrupted by malware. Finally, the autonomous response module can execute at least one autonomous response to the cyber threat identified by the cyber threat module to mitigate the cyber threat. (Block 210).

The analyzer module can be configured with one or more data analysis processes to cooperate with the one or more AI models trained with machine learning on the normal pattern of life in the system, to identify at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

The analyzer module may use the agent analyzer data analysis process that detects a potentially malicious agent previously unknown to the system via using either an 1) analysis of JA3 hashes when monitoring and analyzing a secured communication connection without needing to decrypt content in network traffic or 2) an analysis of user agent data when monitoring and analyzing an unsecured communication connection to start an investigation on one or more possible cyber threat hypotheses. The determination and output of this step is what are possible cyber threats that can include or be indicated by the identified abnormal behavior and/or identified suspicious activity identified by the agent analyzer data analysis process.

The analyzer module may use the agent analyzer data analysis process to detect a potentially malicious agent previously unknown to the system using either an 1) analysis of JA3 hashes when monitoring and analyzing a secured connection without needing to decrypt content in network traffic or 2) an analysis of user agent data when monitoring and analyzing an unsecured connection to collect additional system data points to support or refute the one or more possible cyber threat hypotheses, which factors in at least how rare is it for 1) a process, 2) a device, or 3) both to connect to the endpoint connection from this network.

The analyzer module can use the agent analyzer data analysis process to create and/or analyze additional data points, including data, metrics, and meta data, obtained from the malicious agent detection using either an analysis of i) JA3 hashes when monitoring and analyzing a secured encrypted connection, like a SSL connection, and an analysis of user agent data when monitoring and analyzing an unsecured connection, to identify abnormal behavior and/or suspicious activity data with the one or more AI models trained with machine learning on possible cyber threats. An initial analysis of the i) JA3 hashes when monitoring and analyzing details of an endpoint of the secured connection and what process and/or device is making that secured connection with the endpoint of the secured connection; and/or analysis of user agent data when monitoring and ii) analyzing an unsecured connection can identify the initial abnormal behavior and/or suspicious activity data.

The cyber threat analyst module is configured to form and investigate hypotheses on what are a possible set of cyber threats and can cooperate with the analyzer module with the one or more data analysis processes to conduct an investigation on a possible set of cyber threats hypotheses that would include the at least one of i) the abnormal behavior, ii) the suspicious activity, and iii) any combination of both, identified through cooperation with the one or more AI models trained with machine learning on the normal pattern of life in the system.

Many other model breaches of the AI models trained with machine learning on the normal behavior of the system can send an input into the cyber threat analyst module or the trigger module to trigger an investigation to form one or more hypotheses on what are a possible set of cyber threats that could include the initially identified abnormal behavior and/or suspicious activity. Note, a deeper analysis of the i) JA3 hashes when monitoring and analyzing a secured connection and/or analysis of user agent data when monitoring and analyzing an unsecured connection can also be used as additional data to help support or refute possible cyber threat hypotheses. For example, the deeper analysis can look at example factors such as i) how long has the endpoint existed or is registered; ii) what kind of certificate is the communication using; iii) is the endpoint on a known good hostname or known bad hostname or an unknown hostname, and if unknown what other information exists such as registrant's name and/or country; iv) how rare; v) etc.

An analyzer module can analyze all endpoint connections split up by JA3 hashes or user agent data, such as user-agent strings by similarity to each other. The analyzer module groups similar JA3 connections (or user agent data) and separates them out or user agent data and separates them out in multiple groups in order to analyze the smaller groups of similar i) JA3 connections individually linked to each distinct process range of distinct connection endpoints or ii) user agent data individually linked to each distinct process' user agent data for the range of distinct connection endpoints.

This subdivision of, for example, JA3 connections can cut down on the number of false positive assertions of a potential malicious agent.

The determination and output of this step is 'are the results of this investigation interesting enough to report out and/or pass onto either a human-led cyber investigation and/or final in-depth artificial intelligence based cyber threat investigation' that can trigger an autonomous response action.

The cyber threat analyst module in the AI-based cyber security appliance 100 provides an advantage as it reduces the time taken for human led or cybersecurity investigations, provides an alternative to manpower for small organizations and improves detection (and remediation) capabilities within the cyber security platform.

The analyzer module may form an investigation on what are a possible set of cyber threats that could include the initially identified abnormal behavior and/or suspicious activity with one or more AI models trained with machine learning on possible cyber threats (Block 212).

Next, the process identifier in the analyzer module is then configured to cooperate with the data gathering module to collect any additional data and metrics either to support or to refute possible cyber threat hypothesis. The analyzer module can also look for other anomalies, such as model breaches, and other techniques discussed above, while the AI models trained on potential cyber threats to assist in examining and factoring these additional data points that have occurred over a given timeframe to see if a correlation exists between a series of two or more anomalies occurring within that time frame.

The initially identified abnormal behavior and/or suspicious activity may be, for example, a system misconfiguration, true human error, or an actual cyber threat including artificial intelligent based cyber threats that specifically try to distribute its malicious behavior over several events over a number of days so that no single event appears to be an overt cyber-attack. Note, the cyber threat analyst module may conduct the investigation and can make a final decision that need not be a positive determination that a cyber threat has been detected but rather a determination that something interesting is occurring in the system. The something interesting could be a possible cyber threat but at least one of i) should be brought to an attention of a human cyber security analysis and ii) further warrants a more in-depth human-led and/or an in-depth machine-learning-led automated cyber threat investigation with the one or more AI models trained on potential cyber threats. (Block 212) An analyzer module can make a final decision that a positive determination that a cyber threat has been detected. The one or more AI models trained on potential cyber threats and the assessment module with the AI classifiers can determine that a cyber-attack is occurring and assign a numerical assessment of the most likely cyber threat hypothesis that is occurring, which is indicative of a severity of the cyber-attack underway. (Block 216) The assessment module can then assess the data supporting a hypothesis and what is the potential threat of harm by this supported hypothesis and assign the threat score that represents the threat level posed by that cyber threat hypothesis. (Block 218) The assessment module with the AI classifiers can cooperate with an autonomous response module to determine an appropriate response to mitigate the cyber-attack that is occurring. The autonomously actions can then be taken in response to the potential threat with its assigned the threat score. (Block 220)

Figure 3:
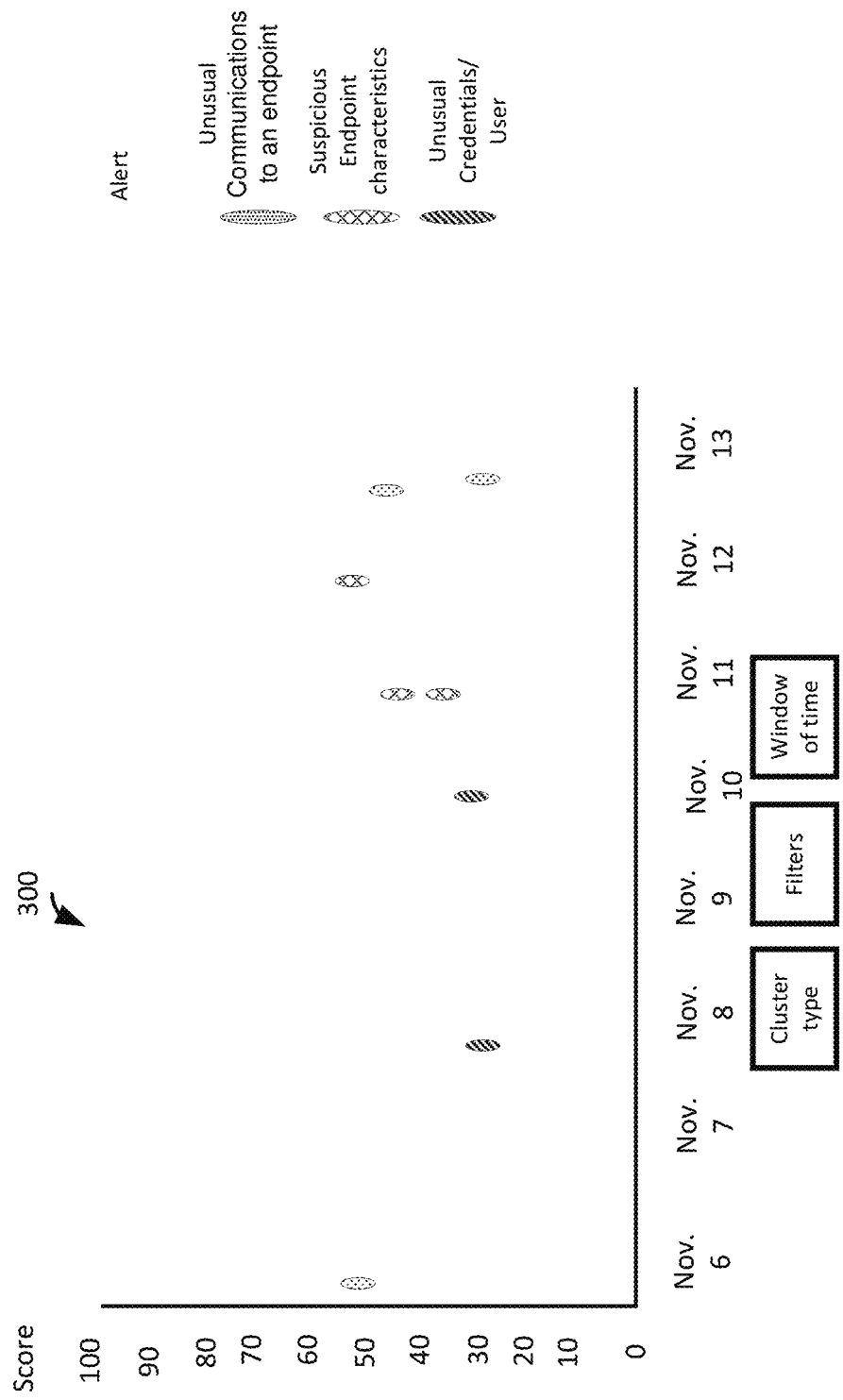
FIG. 3 illustrates a graph of an embodiment of an example chain of unusual behavior for a network entity activity in connection with the rest of the network under analysis.

In an example, a behavioral pattern analysis of what are the unusual behaviors of the network/system/device/user under analysis by the machine learning models may be as follows. FIG. 3 illustrates a graph 300 of an embodiment of an example chain of unusual behavior for, in this example, the network activities deviating from a normal pattern of life in connection with the rest of the network under analysis. The cyber threat analyst module and/or analyzer module can cooperate with one or more machine learning models as well as the AI classifier 620 and fingerprint module 820. One or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by initially examining what activities/events/alerts that fall outside the window of what is the normal pattern of life for that network/system/device/user under analysis, and then casual links between them in order to determine whether that activity is unusual or suspicious. A chain of related activity that can include both unusual activity and activity within a pattern of normal life for that entity can be formed and checked against cyber threat hypothesis to determine whether that pattern is indicative of a behavior of a malicious actor—human, program, or other threat. An example behavioral pattern analysis of what are the unusual behaviors may be as follows. The unusual pattern may be determined by initially examining what activities/events/alerts that do not fall within the window of what is the normal pattern of life for that network/system/device/user/email under analysis, and then causal links can be analyzed to determine whether that pattern is indicative of a behavior of a malicious actor—human, program, email, or other threat. The cyber threat analyst module can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The modules of the cyber security appliance 100 detect a chain of anomalous behavior of unusual data transfers and/or other communications three times to an endpoint that this user agent does not normally communicate with, three endpoint IP addresses have suspicious characteristics overlapping with a known malicious web server. The three protocol connection requests seem to have some causal link to each other as well as to the communications to an endpoint that this user agent does not normally communicate with. Likewise, twice unusual credentials attempted the unusual behavior of trying to gain access to sensitive areas or malicious IP addresses and the user associated with the unusual credentials trying unusual behavior has a causal link to at least one of those three communications to endpoint that this user agent does not normally communicate with. The cyber security appliance 100 can go back and pull in some of the normal activities to help support or refute a possible hypothesis of whether that pattern is indicative of a behavior of a malicious actor. The analyser module can cooperate with one or more models trained on cyber threats and their behavior to try to determine if a potential cyber threat is causing these unusual behaviors. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviors under analysis, that are equal to or above a configurable level of threat posed by this malicious actor.

The chain the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

The AI models may perform by the threat detection through a probabilistic change in a normal behavior through the application of, for example, an unsupervised Bayesian mathematical model to detect behavioral change in computers and computer networks. The Bayesian probabilistic approach can determine periodicity in multiple time series data and identify changes across single and multiple time series data for the purpose of anomalous behavior detection. From the email and potentially IT network raw sources of data, multiple metrics can be derived each producing time series data for the given metric.

Referring back to FIG. 2, the user agent request header can be a characteristic string that lets servers and network peers identify the application, operating system, vendor, and/or version of the requesting user agent. The analyzer module determines whether malicious activity i) is likely occurring via JA3 on the secured connection and/or ii) is likely occurring with a given user agent because of the rarity of connecting to that user agent, country of registration, peculiarity of the user agent data, and/or other possible indicators associated with potential malicious nature. Again, the unencrypted and encrypted target fingerprints can contain these multiple characteristics of an endpoint connection.

The malicious activity may be a domain fronting threat, for example, a device beaconing to an anomalous content delivery network (CDN) of servers with an unusual JA3 hash that is rarely connected to this network. When a process on that device (especially a new process) is the only process communicating with this endpoint not known to be a legitimate endpoint, then this process is identified as an abnormal process that warrants further investigation.

The data store tracks the processes and devices that are making connections and can store pairings of agent and processes as well as any of their associated features in the data store to pull out relevant features. In another algorithm, the analyzer module may merely look at each endpoint connection for, for example, an SSL connection and its associated hashes to identify abnormal behavior and/or suspicious activity because of the rarity of connecting to that endpoint connection, country of registration, a peculiarity of the hostname associated with the endpoint connection, and/or other possible indicators. The analyzer module cooperates with the process identifier classifier and AI model of a normal pattern of life to build up an understanding of what are normal processes and connections; and thus, what would be then abnormal processes and connections for this network. Note, malicious software running as a distinct process that connects to a range of very rare distinct endpoints for this network can be a heavy indicator to classify that process as an abnormal process. The analyzer module builds up an analysis of the JA3 hashes and user agents of secure and unsecure connections, such as SSL and HTTP connections, which respectively can allow for the identification of these unique abnormal processes from the noise of connections made by legitimate processes, such as browsers, which are classified as a normal process for this network.

The analyzer module analyzes the connections and pulls out the processes that the analyzer module determines are potentially malicious agents that are interesting via the JA3 analysis and/or user agent data analysis. The analyzer module also pulls out the data known to be useful to differentiate between a normal process making connections and an abnormal process (potentially a malicious software agent) making connections from those connections. In an example, the analyzer module can use both analysis of i) the JA3 hashes of specifically SSL connections and/or ii) the user agent request header of HTTP connections to determine whether malicious activity is likely occurring with a given process.

As discussed, an analyzer module can perform a machine learning analysis of the JA3 hashes of SSL connections and user agents of HTTP connections to understand what a normal process is; and thus, by deviation, what is an abnormal process. This analysis can allow for the identification of these unique abnormal processes via the rarity of connecting to that connection from this network, country of registration associated with that connection, peculiarity of the connection data, JA3 fingerprint analysis, and/or other possible indicators associated with potential malicious nature in comparison to the general noise of connections made by legitimate processes such as browsers. The analysis can incorporate modelling the endpoints and connection pattern of life on a device to identify normal processes and abnormal processes when combined with multiple factors, which can subsequently be determined to be an actual malicious agent. For example, a given malicious agent may be 1) making an unusual connection for that process in the device that is rare from this network based on the connection pattern of life of that device and its processes, and factoring 2) i) no other process is making that connection (in the case of a local malicious agent) or ii) merely a few other processes are making that connection (in the case of a distributed malicious agent) for that system, country of registration associated with that connection, peculiarity of the connection data, JA3 fingerprint analysis/user agent data analysis, and/or other possible indicators associated with potential malicious nature. Note, a distributed malware may infect two or more devices to carry out its malicious actions; and thus, even if a couple of devices in the network start establishing connections with a potentially malicious endpoint within a short timeframe and then no other device has ever communicated with that potentially malicious endpoint, then that also can be a strong indicator of potential maliciousness.

An analyzer module weights in knowledge that malicious software typically runs as a distinct process and may connect to a range of distinct endpoints. The analyzer module analysis of the created 'encrypted target fingerprints' derived from JA3 hashes of secure connections and user agent data of unsecure connections allows for the identification of these unique abnormal processes from legitimate processes such as browsers. The analyzer module may also use this similar machine learning training to identify other cyber threats, such as insider threats.

The unsupervised machine learning can be applied to the JA3 data and user agent data. For example, the agent analyzer data analysis process uses algorithms to autonomously detect which JA3s are anomalous for the network as a whole as well as which JA3s are unusual for specific processes in specific devices. An AI model modelling this specific network's behavior can be developed overtime from the base training to observe JA3s that have been encountered before as well as their frequency of occurrence and this can be tailored for each device in the network. The analysis module cooperating with the AI models essentially determine, in an example: this JA3 (3e860202fc555b939e83e7a7ab518c38) has never (or very rarely) been seen in the network before and it is merely used by one device (two to three if a distributed malicious agent). The modules cooperating with each other and the AI models indicate that a process, such as an application or service, is connecting to endpoint destinations, which are used by essentially nobody else on the network, and this process is initiating secure connections, such as TLS/SSL connections, to these destinations. At this point, the analysis module is observing anomalous behavior. This trigger creates a scenario under analysis that is likely often the case for an agent, such as malware or non-compliant software.

The analysis module and/or cyber threat analyst module using the supervised machine learning makes the detection of domain fronting, without having to break up and break into encrypted traffic, possible by instead combining unusual JA3 detection with other anomalies, such as beaconing. This is a good trigger to start hunting for a domain fronting threat hunt.

A deeper analysis of the endpoint data can include things like the hostname metadata itself that can reveal peculiarities and as such one or more indicators of potentially a malicious hostname, such as its URL, then this could help confirm an analysis to determine that indeed a cyber threat has been detected. The analysis module can also look at factors of how rare the endpoint connection is, how old the endpoint is, where geographically the endpoint is located, how a security certificate associated with a communication is verified only by endpoint or by external $3^{rd}$ party, just to name a few additional factors. The analysis module can then assign weighting given to these factors in the machine learning that can be supervised based on how strongly that characteristic has been found to match up to actual malicious sites in the training.

The cyber threat analyst module and/or analyzer module in the AI based cyber security appliance 100 can catch malicious software and domain fronting with JA3.

Next, the formatting module can generate an output such as a printed or electronic report with the relevant data. The formatting module can cooperate with both the analyzer module and the assessment module depending on what the user wants to be reported (Block 218).

The formalized report on the template is outputted for a human user's consumption in a medium of any of 1) printable report, 2) presented digitally on a user interface, 3) in a machine readable format for further use in machine-learning reinforcement and refinement, or 4) any combination of the three.

The assessment module with the AI classifiers, once armed with knowledge that malicious activity is likely occurring/is associated with a given process from the analyzer module, then cooperates with the autonomous response module to take an autonomous action such as i) deny access in or out of the device or the network and/or ii) shutdown activities involving a detected malicious agent (Block 220). For example, the autonomous response module can take an autonomous action by an autonomous response module to prevent a communication connection between a user agent deemed suspicious and the set of one or more suspicious IP addresses.

The cyber threat module, analyzer module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Note, most user agents put identification information into their address string. Most Web browsers can use a User-Agent string value as the following example: Mozilla/[version] ([system and browser information]) [platform] ([platform details]) [extensions]. The hostname may have a top-level hostname of https://www.example.com and the string can further include additional text and character information when the string identifies sub hostnames within the top level hostname such as: https://en.example.com/wiki/Domain_name#Domain_name_syntax Data exfiltration to services, such as cloud storage, can often be to a wide range of IP addresses and connection endpoints, making it difficult to identify previous service usage; and thus, determine an anomaly, such as abnormal behavior or suspicious activity. For example storage services, Dropbox, WeTransfer, and Google Drive can all have a wide range of IP addresses associated with that particular online data storage service. In an example, an authorized backup of company data may occur many times over a week period to, for example, Dropbox and the upload of that backup data goes to a number of different IP address even though all of the backup data is going to Dropbox. However, when an upload is observed from a user agent that normally does not connect these endpoints, and compared to other endpoints contacted by user agents in the client device, then that user agent is deemed suspicious. In addition, more information can be factored in than just endpoints contacted. As discussed, a hostname may have a string identifying a storage hostname with many different IP addresses associated with that hostname. The top level hostname can be, for example, https://www.exampleDropbox.com and the string can further include additional text and character information when the string identifies sub domains within the top level hostname: https://www.exampleDropbox.com/home/October%20event%/preview=veo.com_url.

Additional characteristics can be looked at as already discussed herein.

The data analysis process can have an association function to retrieve metadata and any other information to identify a particular entity with each upload connection correlating properties of a same entity (e.g. JA3, user agent, similar words and terms found in a hostname of each different IP address, ASN, IP name, server, etc.). All of this information is stored in the data store. An analysis process analyzes to see when there is a substantial overlap of these common properties correlate then a determination can be made on whether all of these uploads and/or protocol connections connect to a same entity. The exfiltration data analysis process can use a grouping function to group connections from uploads with shared properties correlating a same entity.

Referring to FIG. 8, a fingerprint module 820 can receive from the analyzer module a hostname for a malicious web server. The analysis can be the results of at least one of manual reporting or automated reporting. The manual reporting can occur by a human inputting the hostname of the malicious web server as a known malicious web server and automated reporting that supplies identities of known malicious web servers (including hostnames) in order to identify the malicious web server.

The fingerprint module 820 can generate an unencrypted target fingerprint based on intransient characteristics of the malicious web server gleaned from unencrypted hypertext transfer protocol communications. The fingerprint module 820 can send a series of unencrypted hypertext transfer protocol requests to generate the unencrypted target fingerprint. The fingerprint module 820 can vary source identifiers for the series of unencrypted hypertext transfer protocol requests. The fingerprint module 820 can access a proxy to vary the source identifiers for the series of unencrypted hypertext transfer protocol requests. The combined web server fingerprint identifies a malicious server's fingerprint. Note the URL of the web server can change but some of the characteristics of the server, proxies used by the malicious web server, and the malicious web server itself often remain the same from the same bad actor.

The fingerprint module 820 can generate an encrypted target fingerprint for the malicious web server based on encrypted secure connection communications. The fingerprint module 820 can send a series of encrypted secure connection requests to generate the encrypted target fingerprint. The fingerprint module 820 can generate a list of encryption ciphers for the series of encrypted secure connection requests to generate the encrypted target fingerprint. The fingerprint module 820 can remove a selected encryption cipher from the list of encryption ciphers for future requests in the series of encrypted secure connection requests to determine encryption cipher order.

The fingerprint module 820 can generate a combined web server fingerprint based on the encrypted target fingerprint and the unencrypted target fingerprint. The fingerprint module 820 can scan a representational portion of an internet of servers to match servers to the combined web server fingerprint. The fingerprint module 820 can generate a list of suspicious servers based on matches to the combined web server fingerprint. The autonomous response module is further configured to inoculate a fleet of network devices against a cyberattack using the encrypted target fingerprint and the unencrypted target fingerprint. The autonomous response module is further configured to push the list of suspicious servers to the fleet of network devices.

The network scan data analysis process may perform a following sequence of steps.

1. The network scan data analysis process may create a virtual tree of IP address space.

The cyber threat analyst module in the AI based cyber security appliance 100 component provides an advantage over competitors' products as it reduces the time taken for cybersecurity investigations, provides an alternative to manpower for small organizations and improves detection (and remediation) capabilities within the cyber security platform. The cyber threat analyst module offers a method of prioritizing which is not just a summary or highest score alert of an event evaluated by itself equals the most bad and prevents more complex attacks being missed because their composite parts/individual threats only produced low-level alerts.

Figure 4:
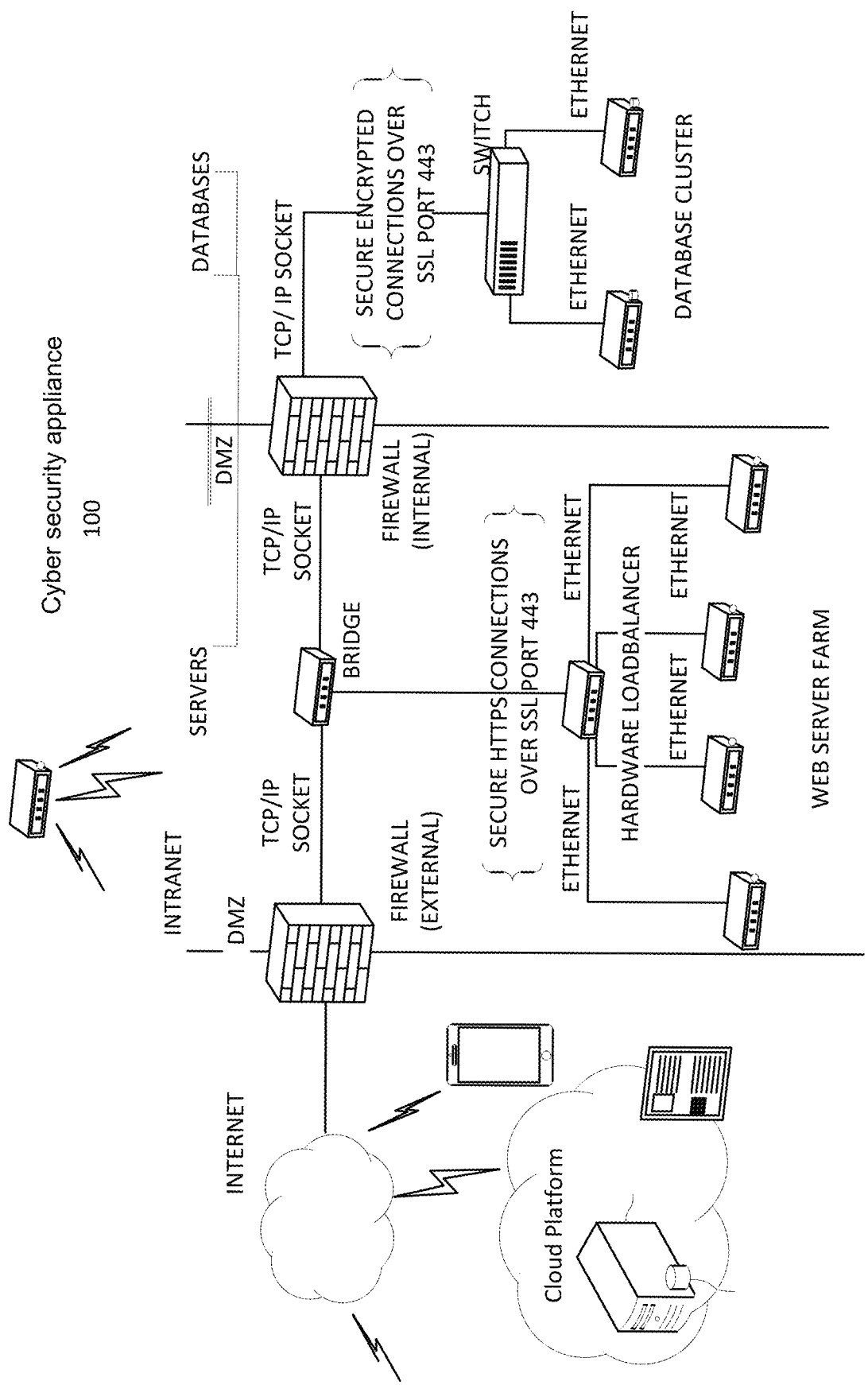
FIG. 4 illustrates an example network to be protected by the cyber security appliance.

FIG. 4 illustrates a block diagram of an embodiment of the AI based cyber security appliance 100 plugging in as an appliance platform to protect a system. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

Figure 5:
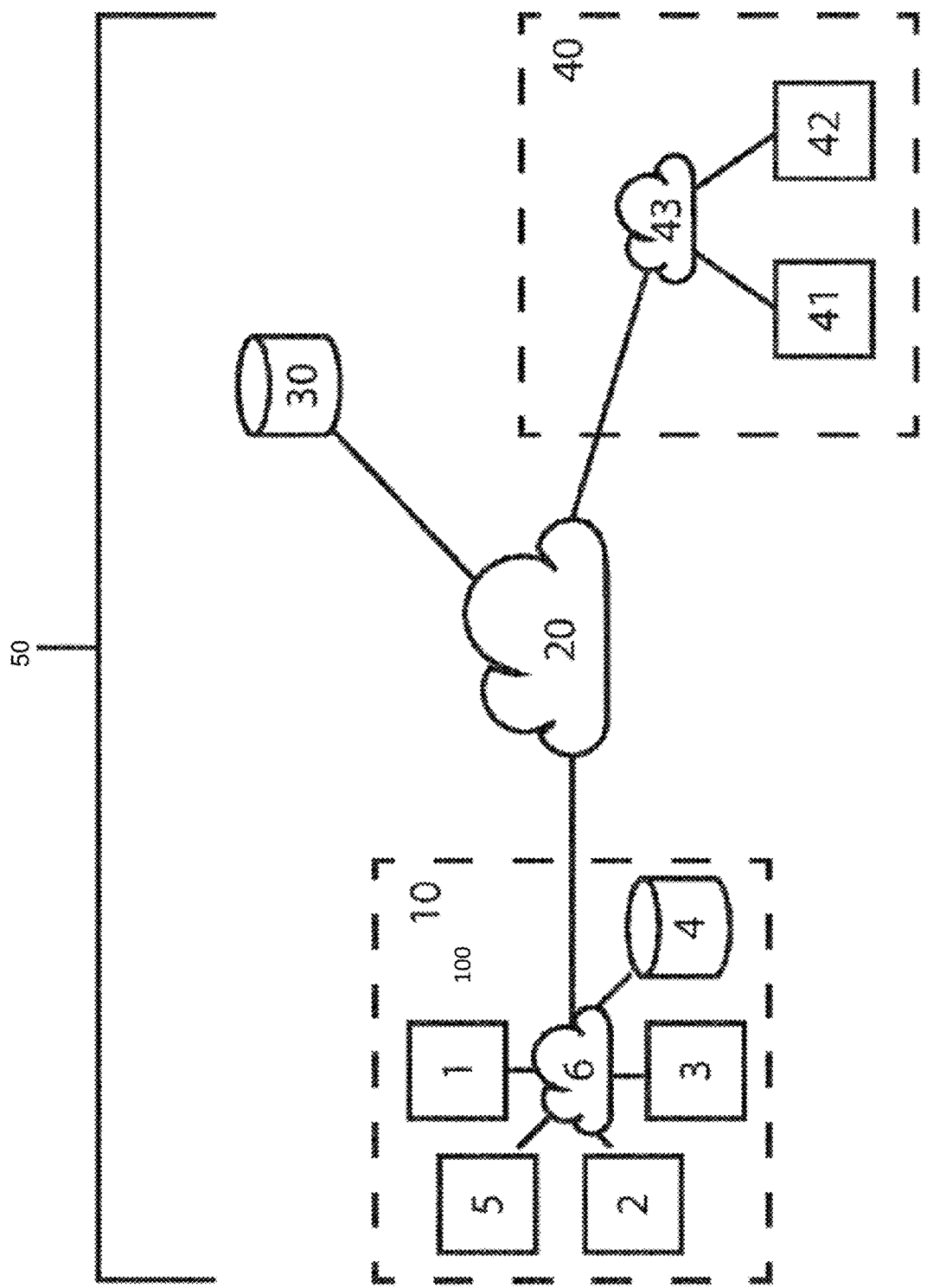
FIG. 5 illustrates an example cyber security appliance protecting an example network.

FIG. 5 illustrates an example cyber security appliance using an AI based cyber threat analyst 100 to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100, computer 1 on the first computer system 10 has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday and is active from about 8:30 AM until 6 PM.

The same employee virtually never accesses the employee time sheets, very rarely connects to the company's Atlanta network, and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation.

The cyber security appliance 100 is built to deal with the fact that today's attackers are getting stealthier, and an attacker/malicious agent may be 'hiding' in a system to ensure that they avoid raising suspicion in an end user, such as by slowing their machine down.

The cyber security appliance 100 builds a sophisticated 'pattern of life'—that understands what represents normality for every person, device, and network activity in the system being protected by the cyber security appliance 100.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiples analyses of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature-based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that most of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from most of the data, which includes rare objects as well as things like unexpected bursts in activity.

The method and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid-state memory, magnetic tape, a removable computer diskette, a random access memory (RAM), a read-only memory (ROM), a rigid magnetic disc, and an optical disk, such as a CD-ROM, CD-RAN or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Predicting a User-Agent String Based on the Visible Data of an Encrypted Communication.

A dataset describing known targets and sources in network communications can be used with a machine learning approach to develop a classifier that can predict a user-agent string identifying the user agent. The known target data and known source data can include JA3 client hashes, JA3 server hashes, hostnames, and user agents. The user-agent predictor can use a FFNN with NLP to train the AI classifier 620 trained to predict user agents. The training can use JA3 hashes and hostnames from the SSL connection and user agent information from the HTTP connection as input data and output data. In the training, the JA3 hashes for the client and the server in connection with hostname information can be accurately matched to the initiating user agent information.

FIG. 6 illustrates a block diagram for generating a user-agent string identifying a source of an endpoint access. The visible signatures 610 from the SSL connection can be used to provide an input into the neural network 620 of the AI classifier 620 trained to predict user agents. The visible signatures can include a JA3 client hash 612 representing the client initiating the connection, a hostname 614 identifying the server targeted by the user agent, and a server JA3 hash 616 representing the server and based on the user agent. The neural network 620 of the AI classifier 620 trained to predict user agents can then use these visible signatures 610 to correctly predict the user-agent string 630 representing the user agent initiating the connection.

The of the AI classifier 620 trained to predict user agents can be trained on data retrieved from a fleet of cyber security appliances each installed in its own network examining connection data, including connection data from a proxy service. In an example, when a proxy is in use, an analysis of the HTTP connection can be analysed to determine interactions with the communication before the SSL process. Using the HTTP connection information prior to the SSL process, the system can map or graph user agents and JA3 hashes for the same connection as well as supply this data for training. The of the AI classifier 620 trained to predict user agents is trained on this data containing user agents matched to JA3 hashes and hostnames.

In the field when deployed, the AI classifier performs an analysis of JA3 hashes and their associated user-agents when monitoring and analysing a secured communication connection. Once trained and then deployed in the field, the AI classifier 620 trained to predict user agents takes an input of JA3 hashes and hostnames determined from SSL connections and outputs a likely user agent initiating the connection. In the field when deployed, this AI classifier 620 trained to predict user agents takes an input of an unknown JA3 client hash, an unknown JA3 server hash, and a hostname, and then outputs the most likely user agent and a confidence score. The JA3 hash information and hostname information are derived from the SSL connection and (for the training process) the user agent derived from the HTTP.

Figure 7:
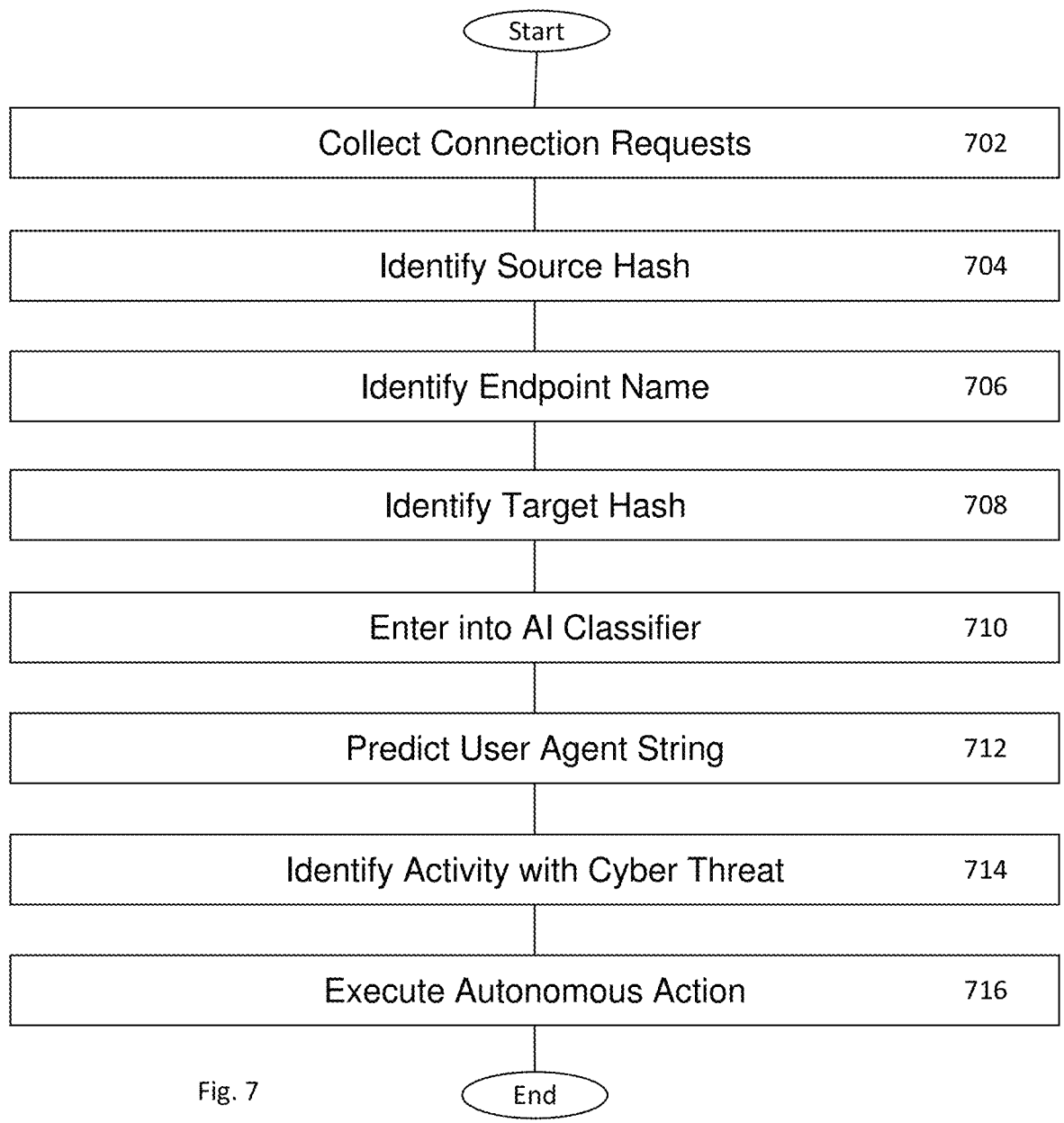
FIG. 7 illustrates a flowchart of an embodiment of a method for generating a user-agent string identifying a source of an access to an endpoint.

FIG. 7 illustrates a flowchart of an embodiment of a method for generating a user-agent string identifying a source of an endpoint access. A domain module collects connection requests from one or more probes deployed to one or more network devices in the fleet (Block 702). An analyzer module identifies a source hash derived from a user agent on a client device initiating access, such as the JA3 client hash, in the connection request (Block 704). The analyzer module identifies the endpoint name, such as the hostname, in the connection request (Block 706). The analyzer module identifies the server hash derived from the endpoint, such as the JA3 server hash, in the connection request (Block 708). The analyzer module can enter as inputs the source hash, the endpoint name, and the server hash into an artificial intelligence classifier trained to predict a user-agent string identifying a user agent application on a client device based on those inputs (Block 710). The analyzer module predicts a user-agent string identifying a user agent application on a client device (Block 712). A cyber threat module can use an AI classifier trained to predict user agents that normally will initiate encrypted connections with the endpoint outside the network to remove predicted user agents that normally will initiate encrypted connections with the endpoint in order to reveal when a suspicious user agent, which does not normally initiate encrypted connections with the endpoint outside the network, but now is attempting to initiate the encrypted connection with the endpoint. The cyber threat module can identify whether activity associated with the user-agent string corresponds to a cyber threat to the client device (Block 714). An autonomous response module configured to execute at least one autonomous response to the cyber threat identified by the cyber threat module to mitigate the cyber threat (Block 716).

Again, the AI classifier 620 trained to predict user agents analyses JA3 hashes and hostname information to correlate/predict their associated user agents from an SSL connection. This is a supervised machine learning approach to predict the likely process, such as a user agent, initiating a connection based upon i) the hostname and ii) JA3 hashes seen in the SSL connection. The SSL connections generally do not show a user agent as well as JA3 hashes from a TLS/SSL session suffer from being rare, rather than unique,—many processes can produce the same JA3.

After training, then the AI classifier 620 trained to predict user agents when deployed can give an output of a predicted user agent, after examining the JA3 hashes and hostnames from the connection from the SSL. For example, based on the JA3s and hostnames from the SSL, the classifier outputs the predicted user agent, which for example, could be a 65% chance that the connection's user's agent was a McAphee endpoint agent. The classifier can be an internal-only analyst tool and could be implemented as a customer-facing tool into the core of the cyber security appliance.

JA3 hashes can be used to identify the signatures of specific processes communicating with endpoints using SSL/TLS. However, as discussed, JA3 hashes are rare rather than unique. Cybersecurity systems may harbor significant uncertainty on the possible process, such as user agents, initiating a connection. Many processes can have the same JA3 hash. This classifier implementation can be an intelligent approach which attempts to make a 'best guess' at the most likely user agent/process initiating the connection.

In general, without the classifier, when a JA3 hash is entered into a search component, the search component will output that many different possible 'processes' in the hash that could be the user agent—the i) browser e.g. Google Chrome, ii) an application or operating system on another user's device, iii) a proxy device/process, iv) a legitimate process initiating the communication, or v) an actual malware software. Many processes can interact with the communication from the user agent initiating the connection and generation of the communication through a same API to receipt of the communication in the end device in the organization's network.

In an example, the AI classifier in the cyber security appliance correlates elements of a connection together in the platform's Advanced Search component—where a proxy is in use, the cyber security appliance observes the initial HTTP_CONNECT negotiation (contains a user agent) and the TLS connection (JA3 hashes and hostname). Using this correlated data, for training, the AI classifier can create a dataset of user agents, JA3 client hashes, JA3 server hashes, and hostnames being accessed across a fleet of cyber security appliances. The user agent in general identifies the client software originating the request. The user agent operating in a network protocol can often identify itself, its application type, operating system, software vendor, or software revision, by submitting a characteristic identification string in a header of its communication to its operating peer. For the AI classifier, the user agent can be simplified to the software name and Operating System version, where applicable. This is an important approach to gathering this dataset—in contrast, another implementation attempting to identify all possible user agents for a JA3 hash requires the user to navigate to an endpoint in their browser or running an endpoint agent, which monitors outgoing connections and is therefore heavily limited.

Inoculation System

A cyber security system can implement an autonomous response module cooperating with the other modules to form an inoculation system to identify malware via training an AI classifier. This inoculation system attempts to identify malware by looking for combinations of endpoints and agents on a client device. A typical client device can be an employee's laptop computer, desktop computer, smart phone, etc. An example endpoint outside the network can be a firewall, DNS server, a web server, URL, a domain, etc. Example user agents can be one or more of the following (i) browser, (ii)

application or operating system of another user's device, (iii) a proxy device and/or process, (iv) a legitimate process initiating communication, and/or (v) malware software. The cyber security system gathers and shares this endpoint signature information across all the network cyber security deployments from a database of these signatures.

Again, a user agent, whether benign or malicious, tends to connect to a low number of unique endpoints. When an endpoint is classified as potentially malicious, such as through a model breach, details of the endpoint along with the JA3 of the client device that accessed the endpoint are sent up to the database system for the cyber security system.

The inoculation system can use an approach similar to JARM to develop an encrypted target fingerprint based on the encrypted secure connection. The inoculation system can attempt to make an SSL connection to the endpoint. As part of that connection, the initiator device and the server negotiate over the encryption ciphers used for the connection. The inoculation system creates a hash of ciphers from the SSL connection for this initiator client device and the server connecting to the endpoint negotiation. The inoculation system also initiates an HTTP request or HTTPS request as part of the SSL and hashes the response from the server to this HTTP request. Those two hashes are combined to make a combined fingerprint of the endpoint/malicious web server.

FIG. 8 illustrates a block diagram of a fingerprint module cooperating with the system. A reporter function 810 can provide to the fingerprint module 820 a server name for a malicious web server 830. The report function 810 could be a manual reporter 812 or an automated reporter 814. The fingerprint module 820 could send a series of unencrypted connection protocol requests to the malicious web server 830. The fingerprint module 820 could use these multiple unencrypted connection protocol requests to identify the intransient aspects of the malicious web server 830. The fingerprint module 820 may then use the intransient aspects of the malicious web server 830 to create an unencrypted target fingerprint, possibly by creating a hash of the intransient aspects.

The fingerprint module 820 may then send a series of encrypted secure connection protocol requests to the malicious web server 830. With each encrypted secure connection protocol request, the fingerprint module 820 may establish the order of preference for the encryption ciphers used by malicious web server 830. The fingerprint module 820 may then use the encryption cipher order, possibly by creating a hash of the encryption cipher order, to create an encrypted target fingerprint for the malicious web server 830. The fingerprint module 820 may then combine the encrypted target fingerprint with the unencrypted target fingerprint to create a combined web server fingerprint.

The fingerprint module 820 may use the combined web server fingerprint to scan a representational portion of an internet 840 of devices to match devices to the combined web server fingerprint. The fingerprint module 820 may generate a list of suspicious devices based on substantial matches over a threshold amount to the combined web server fingerprint. The fingerprint module 820 may push the list of suspicious devices to the fleet of network devices.

Figure 9:
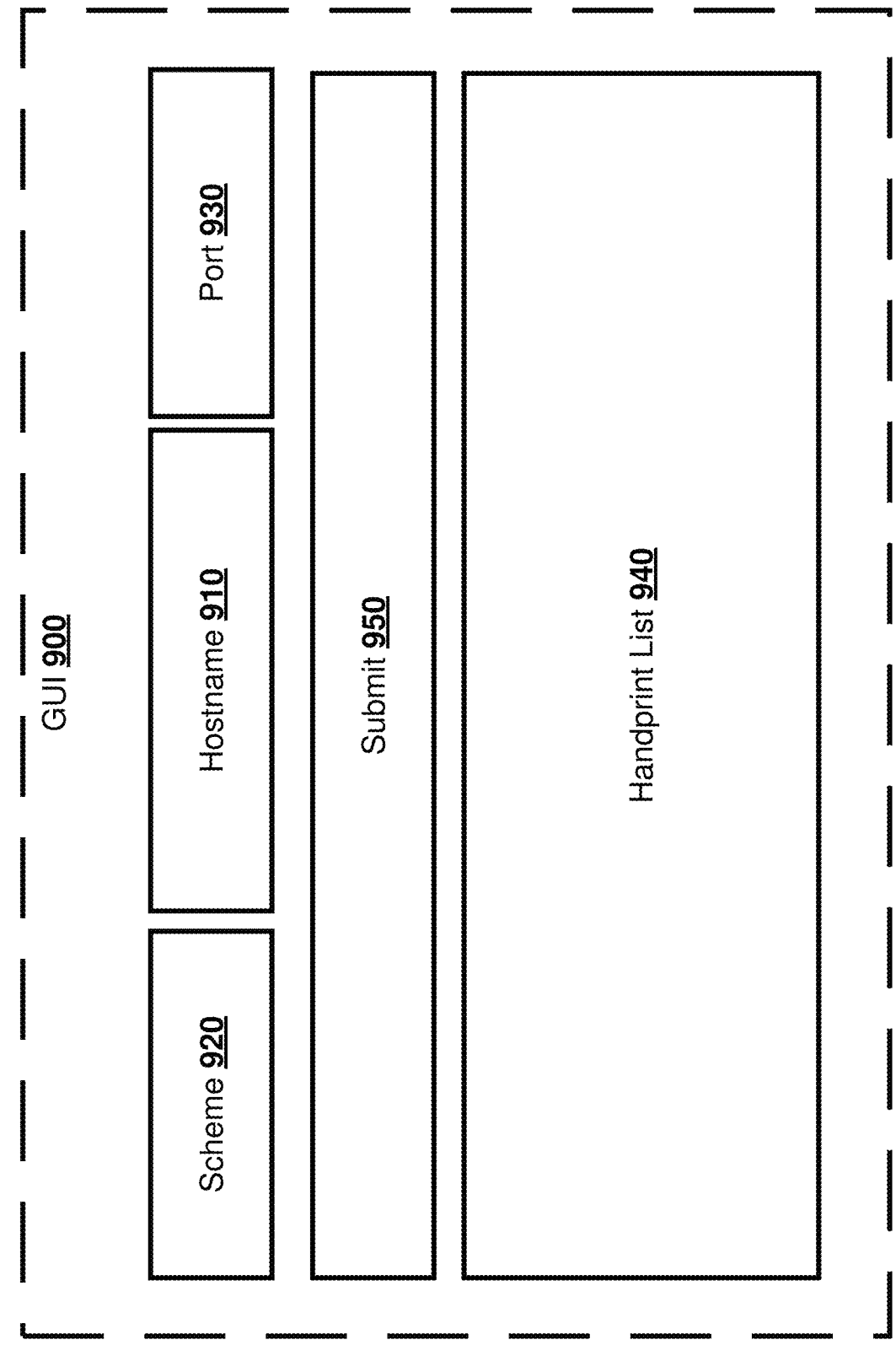
FIG. 9 illustrates a block diagram of a graphical user interface for a cyber security appliance.

FIG. 9 illustrates a block diagram of a graphical user interface (GUI) 900 for the fingerprint module cooperating with the formatting module. The user interface module may present the GUI 900 to an administrator. The GUI 900 may present the hostname 910 for the malicious web server. The GUI 900 may present to the administrator the security scheme 920 and port 930 used for the secure connection to the malicious web server. The GUI 900 may present to the administrator a handprint list 940 identifying devices that match the combined web server fingerprint, indicating that they also may have malicious intent. The GUI 900 may have a submit button 950 to allow the administrator to forward the list of devices to the fleet.

FIG. 10 illustrates a block diagram of an embodiment of a fingerprint module 820. The fingerprint module 820 can have a report sub-module 810 to receive from an analyzer module the hostname for a malicious web server. The fingerprint module 820 can use a connection sub-module 1020 to connect to the malicious web server. An open subcomponent 1022 can send a series of unencrypted connection protocol requests to the malicious web server. The open subcomponent 1022 can vary source identifiers for the series of unencrypted connection protocol requests to obtain different host data from the malicious web server. The open subcomponent 1022 can access a proxy to vary the source identifiers for the series of unencrypted connection protocol requests. A secure subcomponent 1024 can send a series of encrypted secure connection protocol requests to the malicious web server.

The fingerprint module 820 can have a hash sub-module 1030 1030 generate an unencrypted target fingerprint based on intransient characteristics of the malicious web server gleaned from the series of unencrypted connection protocol requests. The hash sub-module 1030 1030 can generate an encrypted target fingerprint for the malicious web server based on the series of encrypted secure connection protocol requests. The hash sub-module 1030 1030 can collect an encryption cipher order for the malicious web server gleaned from the series of encrypted secure connection requests to be a basis for the encrypted target fingerprint. The fingerprint module 820 can have a build sub-module 1040 1040 build a combined web server fingerprint from the encrypted target fingerprint and the unencrypted target fingerprint.

The fingerprint module 820 can have a scan sub-module 1050 1050 scan an internet of devices for suspicious devices that match the combined web server fingerprint. The scan sub-module 1050 1050 can generate a list of suspicious devices based on substantial matches over a threshold amount to the combined web server fingerprint. The fingerprint module 820 can have an inoculation sub-module 1060 inoculate a fleet of network devices against a cyberattack using the combined web server fingerprint to preemptively alert the fleet to future sources of danger. The inoculation sub-module 1060 can push the list of suspicious devices to the fleet of network devices.

Figure 11:
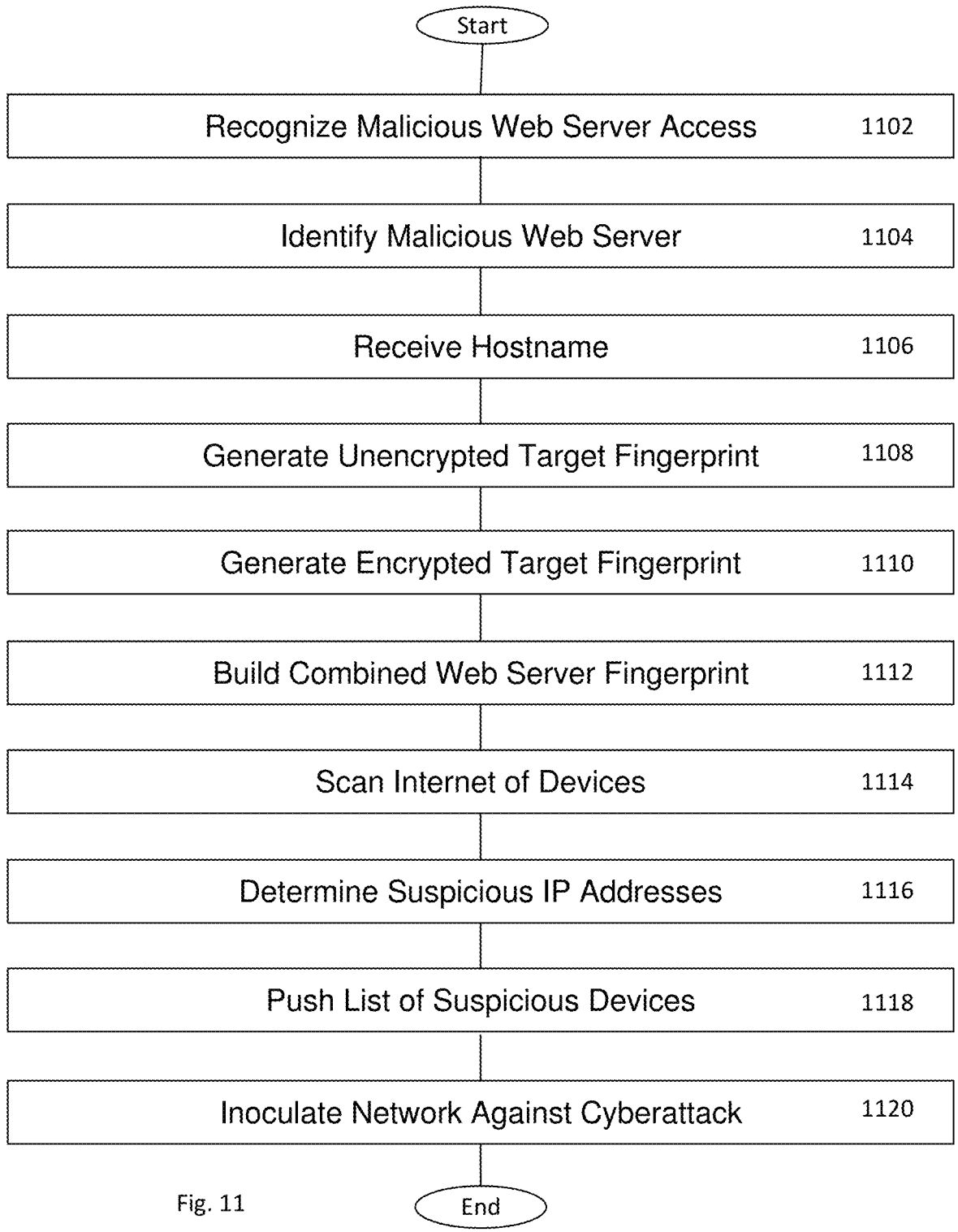
FIG. 11 illustrates a flowchart of an embodiment of inoculating with a combined web server fingerprint for the malicious web server built from both the intransient characteristics of the malicious web server from the unencrypted target fingerprint and the characteristics of the secure communications with the malicious web server from the encrypted target fingerprint.

FIG. 11 illustrates a flowchart of an embodiment of inoculating with combined web server fingerprint for the malicious web server built from both the intransient characteristics of the malicious web server from the unencrypted target fingerprint and the characteristics of the secure communications with the malicious web server from the unencrypted target fingerprint. An analyzer module can recognize an attempt to initiate a protocol connection request to the set of one or more suspicious IP addresses as the cyber threat based on what user-agent is attempting to initiate the protocol connection request to the set of one or more suspicious IP addresses (Block 1102). The analyzer module can identify the hostname based on at least one of manual reporting by a human inputting the malicious web server as a known malicious web server and automated reporting that supplies identities of known malicious web servers in order to identify the malicious web server (Block 1104). A fingerprint module 820 can receive a hostname for the malicious web server from the analyzer module (Block 1106). The fingerprint module 820 can generate an unencrypted target fingerprint based on intransient characteristics of the malicious web server gleaned from sending a series of unencrypted connection protocol requests to the malicious web server (Block 1108). The fingerprint module 820 can generate an encrypted target fingerprint for the malicious web server based on characteristics of the malicious web server gleaned from sending a series of encrypted secure connection protocol requests to the malicious web server (Block 1110). The fingerprint module 820 can build a combined web server fingerprint for the malicious web server based on both the characteristics of the malicious web server from the encrypted target fingerprint derived from the series of encrypted secure connection protocol requests and the intransient characteristics of the malicious web server from the unencrypted target fingerprint derived from the series of unencrypted connection protocol requests (Block 1112). The fingerprint module 820 can scanning a representational portion of an internet of devices to match the set of one or more suspicious IP addresses to characteristics found in the combined web server fingerprint (Block 1114). The fingerprint module 820 can determine a set of one or more suspicious IP addresses that share a substantial similarity to the combined web server fingerprint for the malicious web server (Block 1116). The fingerprint module 820 can generate the set of one or more suspicious IP addresses based on substantial matches over a threshold amount to information derivable from the combined web server fingerprint. The fingerprint module 820 can push the set of one or more suspicious IP addresses to a fleet of cyber security appliances (Block 1118). The fingerprint module 820 can inoculate a fleet of network devices against a cyberattack using the set of one or more IP addresses based on the combined web server fingerprint in order to preemptively alert the fleet of network devices to future sources of danger from the cyberattack (Block 1120).

Figure 12:
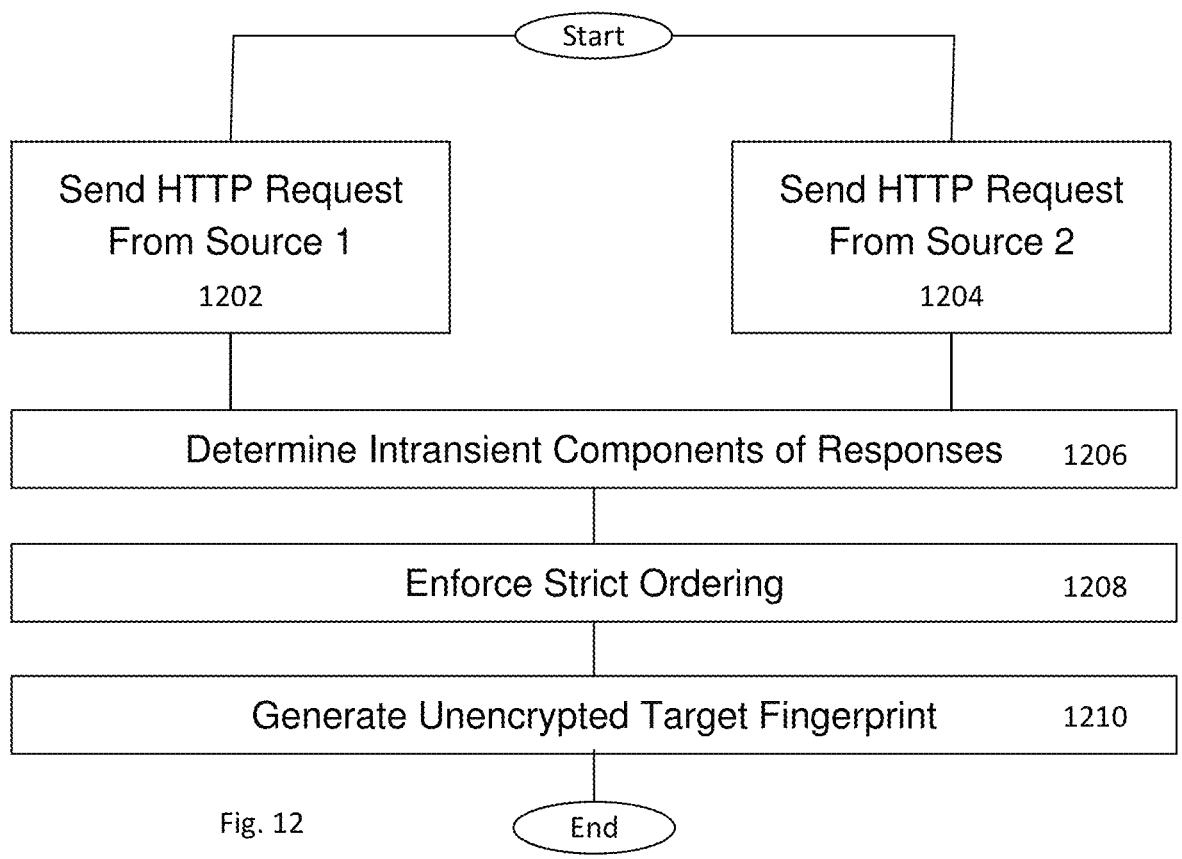
FIG. 12 illustrates a flowchart of an embodiment of a method for generating an unencrypted target fingerprint for a known malicious web server.

FIG. 12 illustrates a flowchart of an embodiment of a method for generating an unencrypted target fingerprint. The fingerprint module 820 can send a series of unencrypted connection protocol requests to generate the unencrypted target fingerprint. The fingerprint module 820 can send an unencrypted connection protocol request, such as an HTTP request, to the malicious web server from a first source (Block 1202). The fingerprint module 820 can vary source identifiers for the series of unencrypted connection protocol requests to the malicious web server in order to obtain different host data from the malicious web server. The fingerprint module 820 can send an HTTP request to the malicious web server from a second source (Block 1204). For example, the fingerprint module 820 can use a proxy to act as the second source for the HTTP requests. Upon receiving the HTTP responses to the HTTP requests from the malicious web server, the fingerprint module 820 can determine the intransient components of the HTTP responses (Block 1206). The fingerprint module 820 may enforce strict ordering of the HTTP responses (Block 1208). The fingerprint module 820 can execute a hash of the intransient aspects of the malicious web server to generate an unencrypted target fingerprint (Block 1210).

Figure 13:
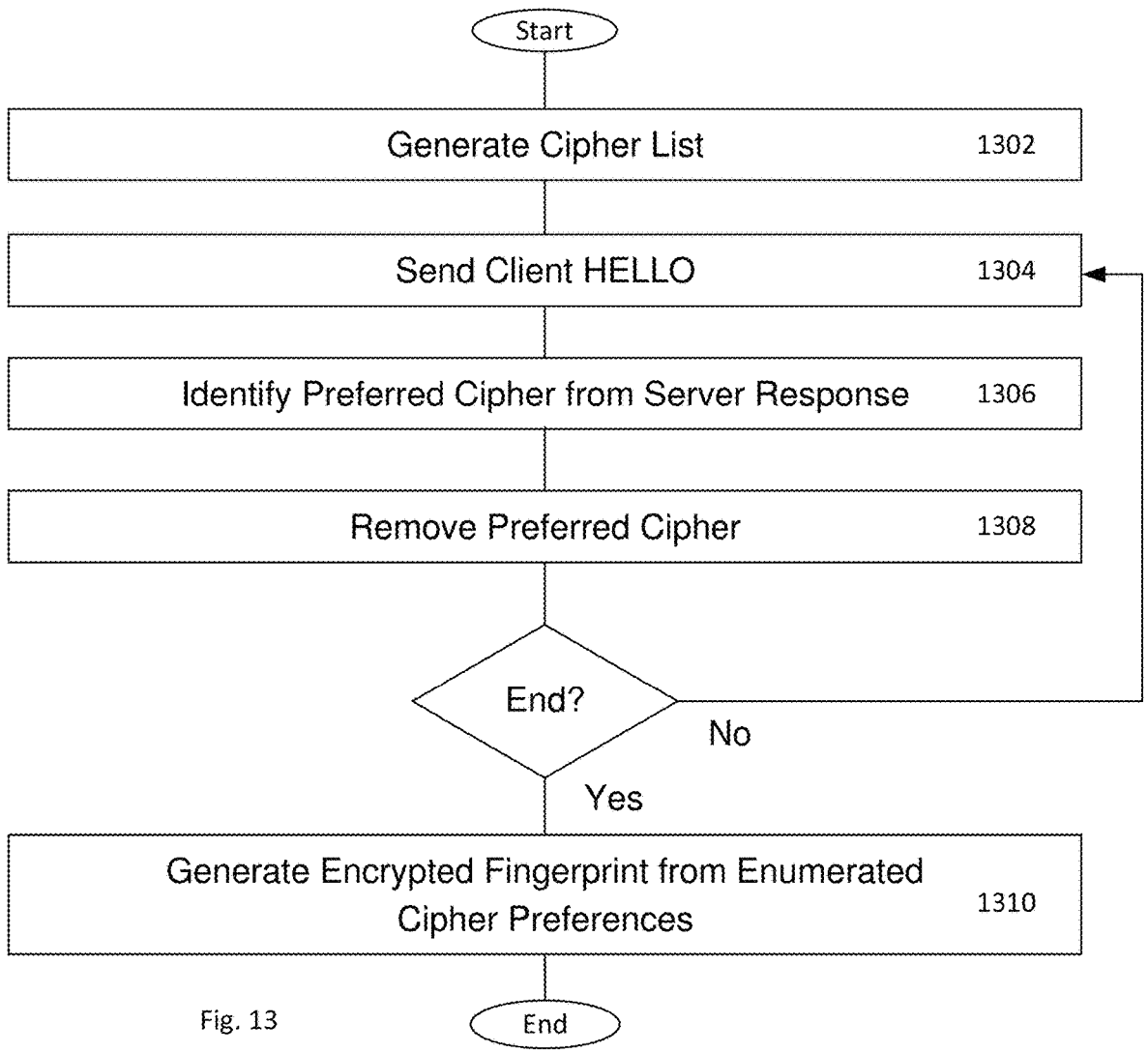
FIG. 13 illustrates a flowchart of an embodiment of a method for generating an encrypted target fingerprint for a known malicious web server.

FIG. 13 illustrates a flowchart of an embodiment of a method for generating an encrypted target fingerprint. The fingerprint module 820 can send a series of encrypted secure connection protocol requests to generate a target fingerprint based on the encrypted communications. This encrypted target fingerprint can be combined with the unencrypted target fingerprint to create a more specific combined web server fingerprint. The fingerprint module 820 can generate a list of encryption ciphers used by a server for the malicious web server for the series of encrypted secure connection protocol requests to supply some of the characteristics of the malicious web server in the primary target fingerprint (Block 1302). The fingerprint module 820 can send an encrypted secure connection protocol request, such as a HELLO message, presenting the list of encryption ciphers to the malicious web server (Block 1304). Upon receiving a server response, the fingerprint module 820 can identify the preferred cipher for the web server from the server response (Block 1306). The fingerprint module 820 can remove the preferred encryption cipher from the encryption cipher order list (Block 1308). The fingerprint module 820 can repeatedly send HELLO messages to the web server to generate a list of enumerated cipher preferences for that web server. The fingerprint module 820 can generate an encrypted target fingerprint for the web server from the enumerated cipher preferences for that web server (Block 1310).

Computing Devices

Figure 14:
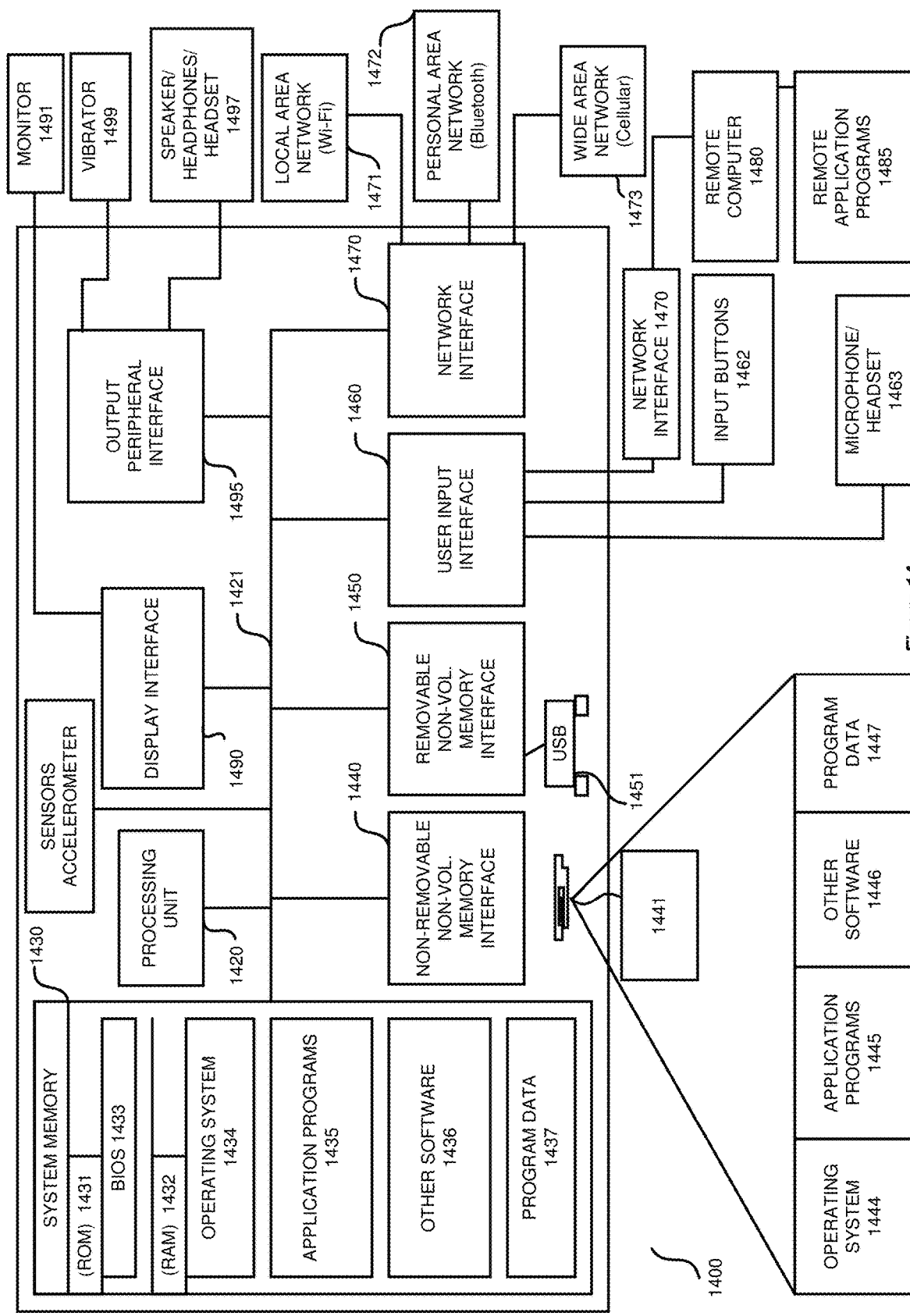
FIG. 14 illustrates a block diagram of an embodiment of one or more computing devices that can be a part of the cyber security appliance and other computing devices for an embodiment of the current design discussed herein.

FIG. 14 illustrates a block diagram of an embodiment of one or more computing devices that can be a part of the cyber security appliance and other computing devices for an embodiment of the current design discussed herein.

The computing device may include one or more processors or processing units 1420 to execute instructions, one or more memories 1430-1432 to store information, one or more data input components 1460-1463 to receive data input from a user of the computing device 1400, one or more modules that include the management module, a network interface communication circuit 1470 to establish a communication link to communicate with other computing devices external to the computing device, one or more sensors where an output from the sensors is used for sensing a specific triggering condition and then correspondingly generating one or more preprogrammed actions, a display screen 1491 to display at least some of the information stored in the one or more memories 1430-1432 and other components. Note, portions of this design implemented in software 1444, 1445, and 1446 are stored in the one or more memories 1430-1432 and are executed by the one or more processors 1420. The processing unit 1420 may have one or more processing cores, which couples to a system bus 1421 that couples various system components including the system memory 1430. The system bus 1421 may be any of several types of bus structures selected from a memory bus, an interconnect fabric, a peripheral bus, and a local bus using any of a variety of bus architectures.

Computing device 1402 typically includes a variety of computing machine-readable media. Machine-readable media can be any available media that can be accessed by computing device 1402 and includes both volatile and nonvolatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 1402. Transitory media such as wireless channels are not included in the machine-readable media. Machine-readable media typically embody computer readable instructions, data structures, and other executable software.

In an example, a volatile memory drive 1441 is illustrated for storing portions of the operating system 1444, application programs 1445, other executable software 1446, and program data 1447.

A user may enter commands and information into the computing device 1402 through input devices such as a keyboard, touchscreen, or software or hardware input buttons 1462, a microphone 1463, a pointing device and/or scrolling input component, such as a mouse, trackball or touch pad 1461. The microphone 1463 can cooperate with speech recognition software. These and other input devices are often connected to the processing unit 1420 through a user input interface 1460 that is coupled to the system bus 1421 but can be connected by other interface and bus structures, such as a lighting port, game port, or a universal serial bus (USB). A display monitor 1491 or other type of display screen device is also connected to the system bus 1421 via an interface, such as a display interface 1490. In addition to the monitor 1491, computing devices may also include other peripheral output devices such as speakers 1497, a vibration device 1499, and other output devices, which may be connected through an output peripheral interface 1495.

The computing device 1402 can operate in a networked environment using logical connections to one or more remote computers/client devices, such as a remote computing system 1480. The remote computing system 1480 can a personal computer, a mobile computing device, a server, a router, a network PC, a peer device or other common network node, and typically includes many or all of the elements described above relative to the computing device 1402. The logical connections can include a personal area network (PAN) 1472 (e.g., Bluetooth®), a local area network (LAN) 1471 (e.g., Wi-Fi), and a wide area network (WAN) 1473 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 1402 is connected to the LAN 1471 through a network interface 1470, which can be, for example, a Bluetooth® or Wi-Fi adapter. When used in a WAN networking environment (e.g., Internet), the computing device 1402 typically includes some means for establishing communications over the WAN 1473. With respect to mobile telecommunication technologies, for example, a radio interface, which can be internal or external, can be connected to the system bus 1421 via the network interface 1470, or other appropriate mechanism. In a networked environment, other software depicted relative to the computing device 1402, or portions thereof, may be stored in the remote memory storage device. By way of example, and not limitation, remote application programs 1485 as reside on remote computing device 1480. It will be appreciated that the network connections shown are examples and other means of establishing a communications link between the computing devices that may be used.

It should be noted that the present design can be carried out on a computing device such as that described with respect to this Figure. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A method for a cyber security appliance incorporating data across multiple platforms used by a client system to identify a cyber threat, comprising:
   receiving a hostname for a malicious web server;

generating an unencrypted target fingerprint based on intransient characteristics of the malicious web server gleaned from sending a series of unencrypted connection protocol requests to the malicious web server;

generating an encrypted target fingerprint for the malicious web server based on characteristics of the malicious web server gleaned from sending a series of encrypted secure connection protocol requests to the malicious web server;

building a combined web server fingerprint for the malicious web server based on both the characteristics of the malicious web server from the encrypted target fingerprint derived from the series of encrypted secure connection protocol requests and the intransient characteristics of the malicious web server from the unencrypted target fingerprint derived from the series of unencrypted connection protocol requests;

determining a set of one or more suspicious IP addresses that share a substantial similarity over a threshold to information associated with the combined web server fingerprint for the malicious web server; and inoculating a fleet of network devices against a cyberattack using the set of one or more IP addresses based on the combined web server fingerprint in order to preemptively alert the fleet of network devices to future sources of danger from the cyberattack.

2. The method for the cyber security appliance of claim 1, further comprising:

identifying the hostname based on at least one of manual reporting by a human inputting the malicious web server as a known malicious web server and automated reporting that supplies identities of known malicious web servers in order to identify the malicious web server.

3. The method for the cyber security appliance of claim 1, further comprising:

recognizing an attempt to initiate a protocol connection request to the set of one or more suspicious IP addresses as the cyber threat based on what user-agent is attempting to initiate the protocol connection request to the set of one or more suspicious IP addresses.

4. The method for the cyber security appliance of claim 1, further comprising:

taking an autonomous action by an autonomous response module to prevent a communication connection between a user agent deemed suspicious and the set of one or more suspicious IP addresses.

5. The method for the cyber security appliance of claim 1, further comprising:

using an AI classifier trained to predict user agents that normally will initiate encrypted connections with an endpoint outside the network to remove predicted user agents that normally will initiate encrypted connections with the endpoint in order to reveal when a suspicious user agent, which does not normally initiate encrypted connections with the endpoint outside the network, but now is attempting to initiate the encrypted connection with the endpoint;

factoring both 1) when the suspicious user agent, which does not normally initiate encrypted connections with the endpoint outside the network, but now is attempting to initiate the encrypted connection with the endpoint and 2) whether the endpoint shares the substantial similarity over the threshold to the combined web server fingerprint for the malicious web server when identifying the cyber threat.

6. The method for the cyber security appliance of claim 1, further comprising:

scanning a representational portion of an internet of devices to match the set of one or more suspicious IP addresses to characteristics found in the combined web server fingerprint.

7. The method for the cyber security appliance of claim 6, further comprising:

generating the set of one or more suspicious IP addresses based on substantial matches over a threshold amount to information derivable from the combined web server fingerprint; and pushing the set of one or more suspicious IP addresses to a fleet of cyber security appliances.

8. The method for the cyber security appliance of claim 1, further comprising:

varying source identifiers for the series of unencrypted connection protocol requests to the malicious web server in order to obtain different host data from the malicious web server.

9. The method for the cyber security appliance of claim 1, further comprising:

generating a list of encryption ciphers used by a server for the malicious web server for the series of encrypted secure connection protocol requests to supply some of the characteristics of the malicious web server in a primary target fingerprint.

10. A method for a cyber security appliance protecting against a cyber threat, comprising:

analyzing tendencies of user agents and their normal connection pattern to a set of endpoint IP addresses;

analyzing characteristics of scanned IP addresses compared to characteristics of a known malicious web server;

determining when the connection pattern to an endpoint IP address by a first user agent under analysis is atypical with regard to other similar user agents, and then considering the first user agent under analysis as suspicious;

determining when an amount of characteristics of a first IP address under analysis matches up, over a threshold amount, to the known malicious web server, and then considering that first IP address under analysis as suspicious; and determining when the first user agent deemed suspicious attempts to make a protocol connection with the first IP address deemed as suspicious because of the amount characteristics in common with the known malicious web server, and then autonomously preventing the protocol connection between the first user agent deemed suspicious and the first IP address deemed as suspicious because it is very likely based on 1) the amount of characteristics matching up and 2) the connection pattern being atypical that the first user agent deemed as suspicious is the cyber threat.

11. An apparatus for a cyber security appliance, comprising:

a domain module configured to collect, from one or more probes deployed to one or more network devices, connection protocol requests having i) a source hash derived from a user agent on a client device initiating an access to an endpoint outside a network being protected by the cyber security appliance, ii) a hostname associated with the endpoint outside the network, and iii) a server hash derived from the endpoint outside the network;

an input module configured to enter as inputs the source hash, the hostname, and the server hash into an artificial intelligence classifier trained to predict a user-agent on a client device that normally will initiate at least encrypted connections with that endpoint based on those inputs;

a cyber threat module configured to identify whether activity associated with the user-agent corresponds to a cyber threat to the client device; and an autonomous response module configured to execute at least one autonomous response to mitigate the cyber threat identified by the cyber threat module, where when any instructions are implemented in software for the domain module, the input module, the cyber threat module, and the autonomous response module, then those instructions are stored in one or more non transitory computing machine-readable mediums in an executable format to be executed by one or more processors.

12. The apparatus for the cyber security appliance of claim 11, wherein the cyber threat module is further configured to identify an attempt to access a malicious web server as the cyber threat based on a user-agent string, which identifies the user agent on a client device executing the access of the malicious web server.

13. The apparatus for the cyber security appliance of claim 11, wherein the cyber threat module is configured to cooperate with the AI classifier trained to predict user agents that normally will initiate encrypted connections with the endpoint outside the network to remove predicted user agents that normally will initiate encrypted connections with the endpoint in order to reveal when a suspicious user agent, which does not normally initiate encrypted connections with the endpoint outside the network, but now is attempting to initiate the encrypted connection with the endpoint.

14. The apparatus for the cyber security appliance of claim 11, further comprising:
a fingerprint module configured to receive the hostname for a malicious web server 1) to generate an unencrypted target fingerprint based on intransient characteristics of the malicious web server gleaned from sending a series of unencrypted connection protocol requests, 2) to create an encrypted target fingerprint for the malicious web server based on sending a series of encrypted secure connection protocol requests, and 3) to build a combined web server fingerprint from the encrypted target fingerprint and the unencrypted target fingerprint, and where the autonomous response module is configured to inoculate a fleet of network devices against a cyberattack using the combined web server fingerprint to preemptively alert the fleet of network devices to future sources of danger from the cyberattack.

15. A fingerprint module for a cyber security appliance, comprising:
a report sub-module configured to receive a hostname for a known malicious web server;
a connection sub-module configured to send a series of unencrypted connection protocol requests to the malicious web server in order to obtain intransient characteristics of the malicious web server as well as to send a series of encrypted secure connection protocol requests to the malicious web server in order to obtain characteristics of secure communications with the malicious web server;
a hash sub-module configured to generate an unencrypted target fingerprint based on the intransient characteristics of the malicious web server gleaned from the series of unencrypted connection protocol requests as well as to generate an encrypted target fingerprint for the malicious web server based on the characteristics of the secure communications with the malicious web server;
a build sub-module configured to build a combined web server fingerprint for the malicious web server from both the intransient characteristics of the malicious web server from the unencrypted target fingerprint and the characteristics of the secure communications with the malicious web server from the encrypted target fingerprint;
a comparator sub module configured to determine a set of one or more suspicious IP addresses that share a substantial similarity over a threshold to information derivable from the combined web server fingerprint; and
an autonomous response module configured to cooperate with the fingerprint module to inoculate a fleet of network devices against a cyberattack using the set of one or more IP addresses based on the combined web server fingerprint to preemptively alert the fleet of network devices to future sources of danger from the cyberattack, where when any instructions are implemented in software for the fingerprint module, the connection sub-module, the hash sub-module, the build sub-module, the comparator sub module, and the autonomous response module, then those instructions are stored in one or more non transitory computing machine-readable mediums in an executable format to be executed by one or more processors.

16. The fingerprint module for the cyber security appliance of claim 15, further comprising:
a scan sub-module to cooperate with the comparator sub module, where the scan sub-module is configured to generate a scan of IP addresses, where the scan sub-module is configured to cooperate with the comparator sub module such that the set of one or more suspicious IP addresses is created based on substantial matches over a threshold amount to information derived from the combined web server fingerprint for the malicious web server.

17. The fingerprint module for the cyber security appliance of claim 16, wherein the autonomous response module is further configured to send the set of one or more suspicious IP addresses to a fleet of cyber security appliances.

18. The fingerprint module for the cyber security appliance of claim 15, wherein the connection sub-module is further configured to vary source identifiers for the series of unencrypted connection protocol requests to the malicious web server to obtain different host data from the malicious web server.

19. The fingerprint module for the cyber security appliance of claim 18, wherein the connection sub-module is further configured to utilize a proxy service to vary the source identifiers for the series of unencrypted connection protocol requests.

20. The fingerprint module for the cyber security appliance of claim 15, wherein the hash sub module is further configured to create a list of encryption ciphers used by a server for the malicious web server for the series of encrypted secure connection protocol requests to supply some of the characteristics of the malicious web server in the encrypted target fingerprint.

* * * * *